(12) United States Patent
Fujita et al.

(10) Patent No.: US 11,691,647 B2
(45) Date of Patent: Jul. 4, 2023

(54) VEHICLE CONTROL SYSTEM

(71) Applicant: Toyota Jidosha Kabushiki Kaisha, Toyota (JP)

(72) Inventors: Kazuyuki Fujita, Gotemba (JP); Shin Tanaka, Numazu (JP); Takayuki Iwamoto, Shizuoka-ken (JP); Masahiro Harada, Hadano (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 249 days.

(21) Appl. No.: 17/081,618

(22) Filed: Oct. 27, 2020

(65) Prior Publication Data

US 2021/0139050 A1 May 13, 2021

(30) Foreign Application Priority Data

Nov. 11, 2019 (JP) ................................. 2019-204260

(51) Int. Cl.
*B60W 50/04* (2006.01)
*B60W 60/00* (2020.01)

(52) U.S. Cl.
CPC ...... *B60W 60/00186* (2020.02); *B60W 50/04* (2013.01)

(58) Field of Classification Search
CPC ........... B60W 60/00186; B60W 50/04; B60W 10/04; B60W 10/18; B60W 10/20; B60W 30/12; B60W 50/0205; B60W 50/0225; B60W 50/029; B60W 30/10; B60W 2050/0297; B60W 60/007; B60W 60/0016; B60W 30/14; B60W 30/181; B60W 40/105; B60W 60/001; B60W 2520/04; B60W 2520/10; B62D 15/025; B60T 7/12;

(Continued)

(56) References Cited

U.S. PATENT DOCUMENTS

2009/0024357 A1* 1/2009 Aso .................. G08G 1/164
                                                         702/181
2009/0162825 A1* 6/2009 Sakai ................ B60W 30/095
                                                         434/322

(Continued)

FOREIGN PATENT DOCUMENTS

JP 2007-230454 A 9/2007
JP 2009-157502 A 7/2009

(Continued)

*Primary Examiner* — Masud Ahmed
(74) *Attorney, Agent, or Firm* — Dinsmore & Shohl LLP

(57) ABSTRACT

A target trajectory generation device generates and outputs target trajectories each including a target position and a target speed of a vehicle. A first target trajectory is intended to perform at least one of steering, acceleration, and deceleration of the vehicle. A second target trajectory is intended to decelerate and stop the vehicle. When a malfunctioning device does not exist, a vehicle traveling control device executes vehicle traveling control based on the first target trajectory. When the malfunctioning device exists, the vehicle traveling control device stops the vehicle by executing the vehicle traveling control based on the second target trajectory output before the malfunction occurs, or based on the second target trajectory output from the target trajectory generation device other than the malfunctioning device.

14 Claims, 25 Drawing Sheets

(58) Field of Classification Search
CPC ............ B60Y 2300/10; B60Y 2300/14; B60Y 2300/18091; G08G 1/16
See application file for complete search history.

(56) References Cited

U.S. PATENT DOCUMENTS

| | | | |
|---|---|---|---|
| 2015/0012166 A1* | 1/2015 | Hauler | G05D 1/0268 |
| | | | 701/23 |
| 2016/0090100 A1* | 3/2016 | Oyama | B62D 15/025 |
| | | | 701/23 |
| 2017/0090476 A1* | 3/2017 | Letwin | B60T 8/17558 |
| 2017/0212513 A1* | 7/2017 | Iida | B60W 30/09 |
| 2018/0043934 A1 | 2/2018 | Okawa | |
| 2021/0237752 A1* | 8/2021 | Ewert | G05D 1/0291 |
| 2021/0269063 A1* | 9/2021 | Lee | B60W 50/029 |
| 2023/0005366 A1* | 1/2023 | Yu | H04W 4/40 |

FOREIGN PATENT DOCUMENTS

| | | |
|---|---|---|
| JP | 2016-037149 A | 3/2016 |
| JP | 2018-024295 A | 2/2018 |

\* cited by examiner

FIG. 2
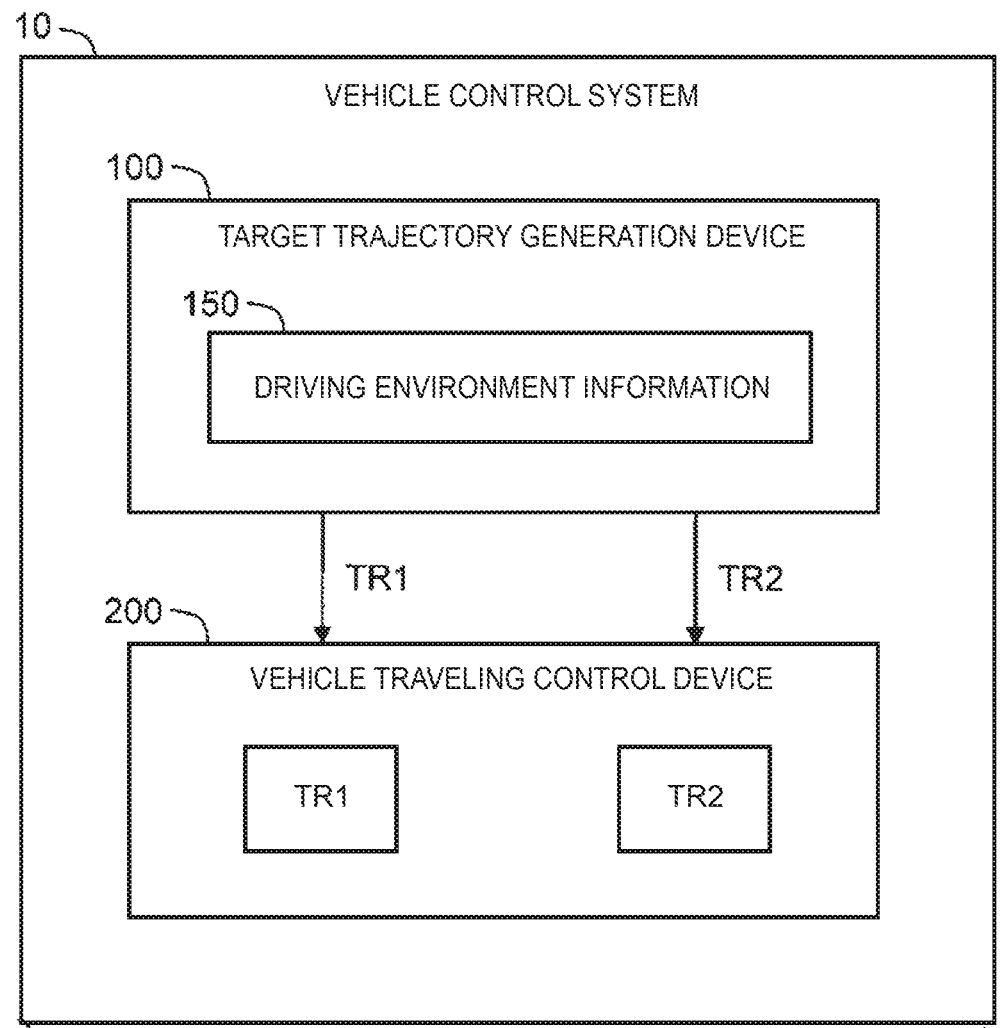
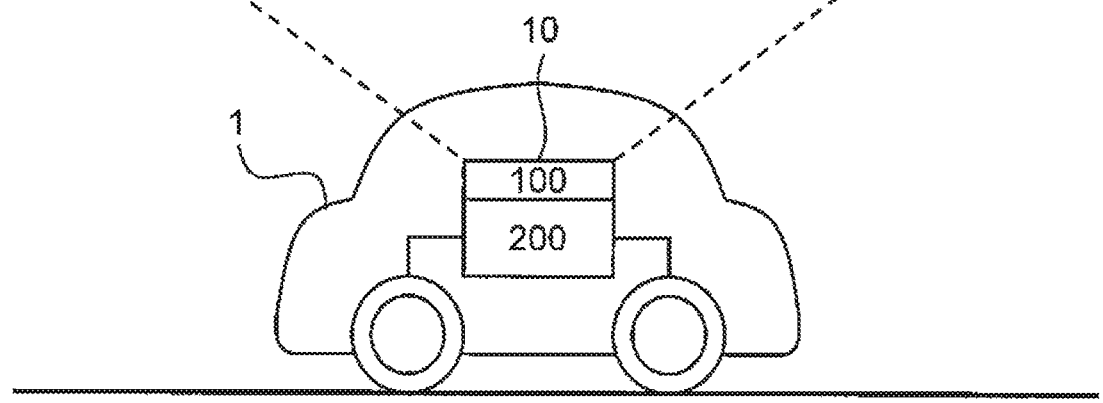

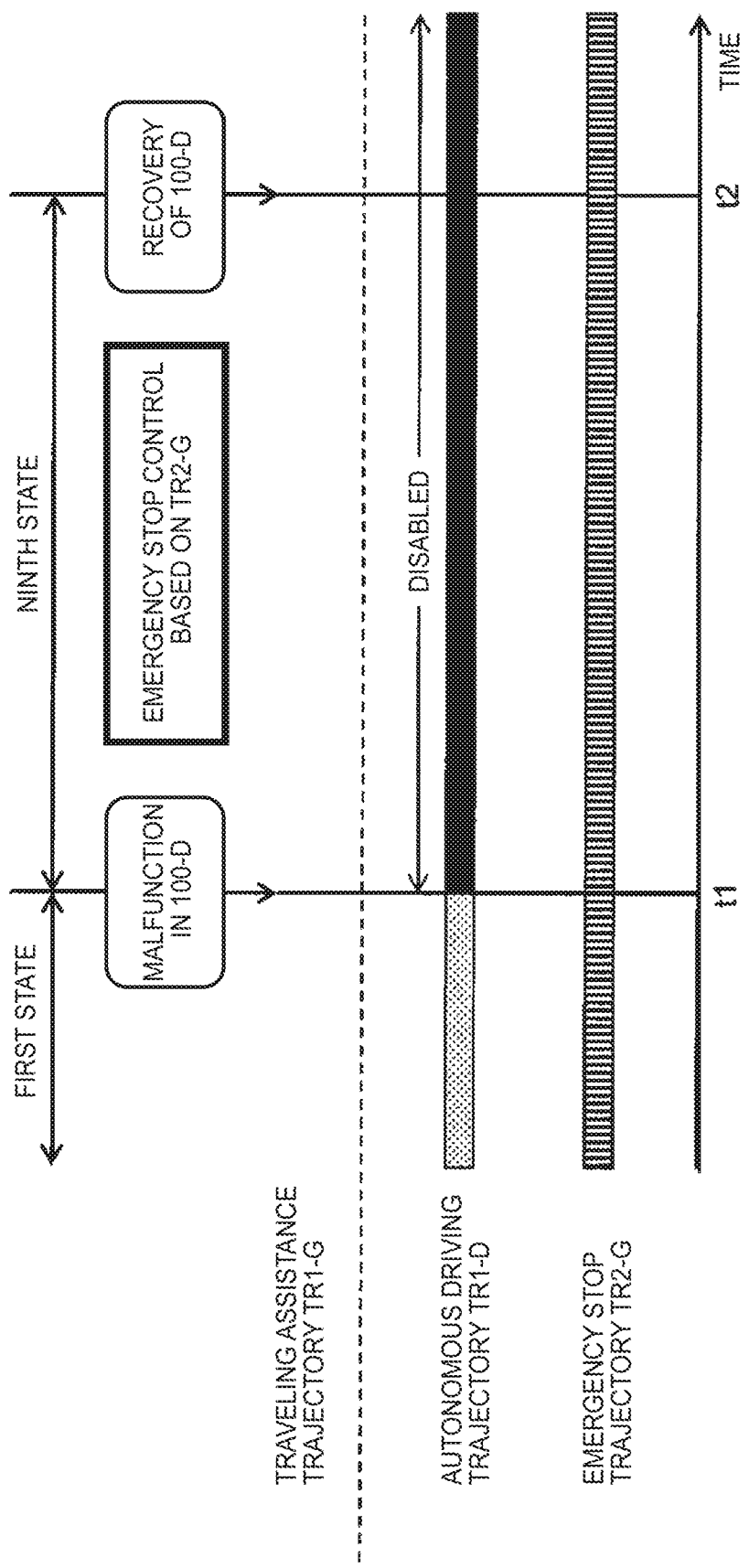

VEHICLE CONTROL SYSTEM

CROSS-REFERENCE TO RELATED APPLICATIONS

This application claims priority to Japanese Patent Application No. 2019-204260 filed on Nov. 11, 2019, which is incorporated herein by reference in its entirety including the specification, drawings and abstract.

BACKGROUND

1. Technical Field

The present disclosure relates to a vehicle control system configured to control a vehicle. In particular, the present disclosure relates to a vehicle control system configured to control traveling of a vehicle based on a target trajectory.

2. Description of Related Art

Japanese Unexamined Patent Application Publication No. 2018-024295 (JP 2018-024295 A) discloses a driving assistance system configured to assist driving of a vehicle. The driving assistance system includes an imaging unit, a target trajectory generation unit, a traveling condition acquisition unit, and a control unit. The imaging unit acquires an image including a boundary of a lane where the vehicle is traveling. The target trajectory generation unit generates, based on the image, a target trajectory along which the vehicle may travel in the lane. The traveling condition acquisition unit acquires, based on the image, a traveling condition of the vehicle in the lane. The control unit executes steering control based on the target trajectory and the traveling condition such that the vehicle follows the target trajectory.

Japanese Unexamined Patent Application Publication No. 2009-157502 (JP 2009-157502 A) discloses a course evaluation device configured to evaluate courses of a vehicle. The course evaluation device generates a plurality of estimated courses, and evaluates the courses by using two or more different evaluation criteria.

Japanese Unexamined Patent Application Publication No. 2007-230454 (JP 2007-230454 A) discloses a course setting device configured to set a desired course of a specific object. The course setting device estimates possible courses of a plurality of objects including the specific object, and sets the course of the specific object based on estimation results.

SUMMARY

According to the technology described in JP 2018-024295 A, the steering control is executed based on the target trajectory generated by the target trajectory generation unit. When the target trajectory generation unit malfunctions, however, an appropriate target trajectory is not generated. Without an appropriate target trajectory, the safety of vehicle traveling may be lost. There is room for improvement in vehicle traveling control based on the target trajectory.

The present disclosure provides a technology that contributes to securing safety during vehicle traveling control based on a target trajectory.

One aspect of the present disclosure relates to a vehicle control system including one or more target trajectory generation devices and a vehicle traveling control device. The one or more target trajectory generation devices are configured to generate and output target trajectories each including a target position and a target speed of a vehicle. The vehicle traveling control device is configured to receive the target trajectories output from the one or more target trajectory generation devices, and execute vehicle traveling control for controlling traveling of the vehicle based on the received target trajectories. A first target trajectory is the target trajectory for at least one of steering, acceleration, and deceleration of the vehicle. A second target trajectory is the target trajectory for decelerating and stopping the vehicle. A malfunctioning device is a target trajectory generation device having malfunction among the one or more target trajectory generation devices. The vehicle traveling control device is configured to execute, when the malfunctioning device does not exist, the vehicle traveling control based on the first target trajectory output from the one or more target trajectory generation devices. The vehicle traveling control device is configured to stop, when the malfunctioning device exists, the vehicle by executing the vehicle traveling control based on the second target trajectory output from the one or more target trajectory generation devices before the malfunction occurs, or based on the second target trajectory output from a target trajectory generation device other than the malfunctioning device among the target trajectory generation devices.

According to the aspect of the present disclosure, the target trajectory generation device generates and outputs not only the first target trajectory but also the second target trajectory. The second target trajectory is the target trajectory for decelerating and stopping the vehicle. When the malfunctioning device exists, the vehicle traveling control device executes the vehicle traveling control based on the second target trajectory output from the target trajectory generation device before the malfunction occurs, or based on the second target trajectory output from the target trajectory generation device other than the malfunctioning device among the target trajectory generation devices. The vehicle traveling control device decelerates and stops the vehicle by executing the vehicle traveling control based on the second target trajectory. Thus, the safety of the vehicle is secured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a block diagram schematically illustrating the configuration of the vehicle control system according to the first embodiment of the present disclosure;

FIG. 26 is a timing chart for describing an example of vehicle traveling control to be executed by the vehicle control system according to the fifth embodiment of the present disclosure.

DETAILED DESCRIPTION OF EMBODIMENTS

Embodiments of the present disclosure are described with reference to the accompanying drawings.

1. First Embodiment 1-1. Overview of Vehicle Control System

Figure 1:
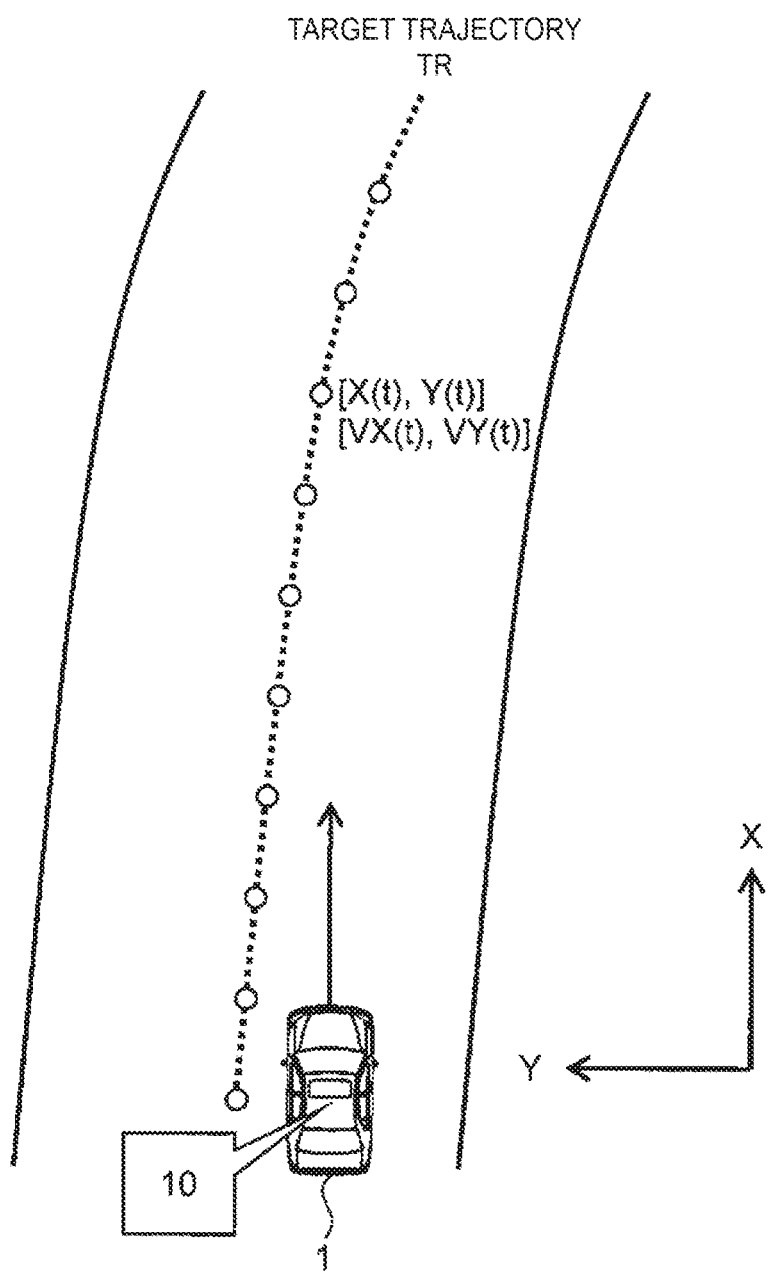
FIG. 1 is a conceptual diagram for describing an overview of a vehicle control system according to a first embodiment of the present disclosure.

FIG. 1 is a conceptual diagram for describing an overview of a vehicle control system 10 according to a first embodiment. The vehicle control system 10 controls a vehicle 1. The vehicle control system 10 is typically mounted on the vehicle 1. Alternatively, at least a part of the vehicle control system 10 may be arranged in an external device outside the vehicle 1 to control the vehicle 1 remotely. That is, the vehicle control system 10 may be distributed over the vehicle 1 and the external device.

The vehicle control system 10 executes "vehicle traveling control" for controlling traveling of the vehicle 1 (steering, acceleration, and deceleration). In particular, the vehicle control system 10 executes the vehicle traveling control based on a target trajectory TR.

The target trajectory TR includes a target position [X(t), Y(t)] and a target speed [VX(t), VY(t)] of the vehicle 1 on a road where the vehicle 1 travels. In the example illustrated in FIG. 1, an X direction is a forward direction of the vehicle 1, and a Y direction is a plane direction orthogonal to the X direction. The coordinate system (X, Y) is not limited to that in the example illustrated in FIG. 1. The target position [X(t), Y(t)] and the target speed [VX(t), VY(t)] are functions of time t. The target speed [VX(t), VY(t)] may be set for each target position [X(t), Y(t)]. That is, the target position [X(t), Y(t)] and the target speed [VX(t), VY(t)] may be associated with each other. The vehicle control system 10 executes the vehicle traveling control such that the vehicle 1 follows the target trajectory TR.

FIG. 2 is a block diagram schematically illustrating the configuration of the vehicle control system 10 according to this embodiment. The vehicle control system 10 includes a target trajectory generation device 100 and a vehicle traveling control device 200. The target trajectory generation device 100 and the vehicle traveling control device 200 may physically be different devices or the same device. When the target trajectory generation device 100 and the vehicle traveling control device 200 are physically different devices, the devices exchange necessary information through communication.

The target trajectory generation device 100 generates the target trajectory TR. More specifically, the target trajectory generation device 100 acquires driving environment information 150 indicating a driving environment of the vehicle 1. For example, the driving environment information 150 includes map information, positional information, and surrounding condition information. The positional information indicates the position and direction of the vehicle 1. The surrounding condition information indicates conditions around the vehicle 1. The target trajectory generation device 100 determines a traveling plan of the vehicle 1 based on the driving environment information 150, and generates the target trajectory TR necessary to achieve the traveling plan. Examples of the traveling plan include a plan to keep a current traveling lane, a plan to change the lane, a plan to avoid an obstacle, and a plan to decelerate and stop. Typically, the target trajectory generation device 100 repeatedly generates the target trajectory TR in each predetermined cycle, that is, updates the target trajectory TR. The target trajectory generation device 100 outputs the generated (updated) target trajectory TR to the vehicle traveling control device 200.

The vehicle traveling control device 200 executes the vehicle traveling control for controlling the traveling of the vehicle 1 (steering, acceleration, and deceleration). In particular, the vehicle traveling control device 200 receives the target trajectory TR output from the target trajectory generation device 100, and executes the vehicle traveling control based on the received target trajectory TR. Typically, the vehicle traveling control device 200 executes the vehicle traveling control such that the vehicle 1 follows the target trajectory TR. Therefore, the vehicle traveling control device 200 calculates deviations between the vehicle 1 and the target trajectory TR (such as a lateral deviation, a yaw angle deviation, and a speed deviation), and executes the vehicle traveling control such that the deviations decrease.

According to this embodiment, two types of target trajectory TR, that is, a "first target trajectory TR1" and a "second target trajectory TR2" are used. The first target trajectory TR1 is a target trajectory TR for at least one of steering, acceleration, and deceleration of the vehicle 1. For example, the first target trajectory TR1 is a target trajectory TR for continuing autonomous driving of the vehicle 1 along a traveling lane. The second target trajectory TR2 is a target trajectory TR for decelerating and stopping the vehicle 1.

Figure 3:
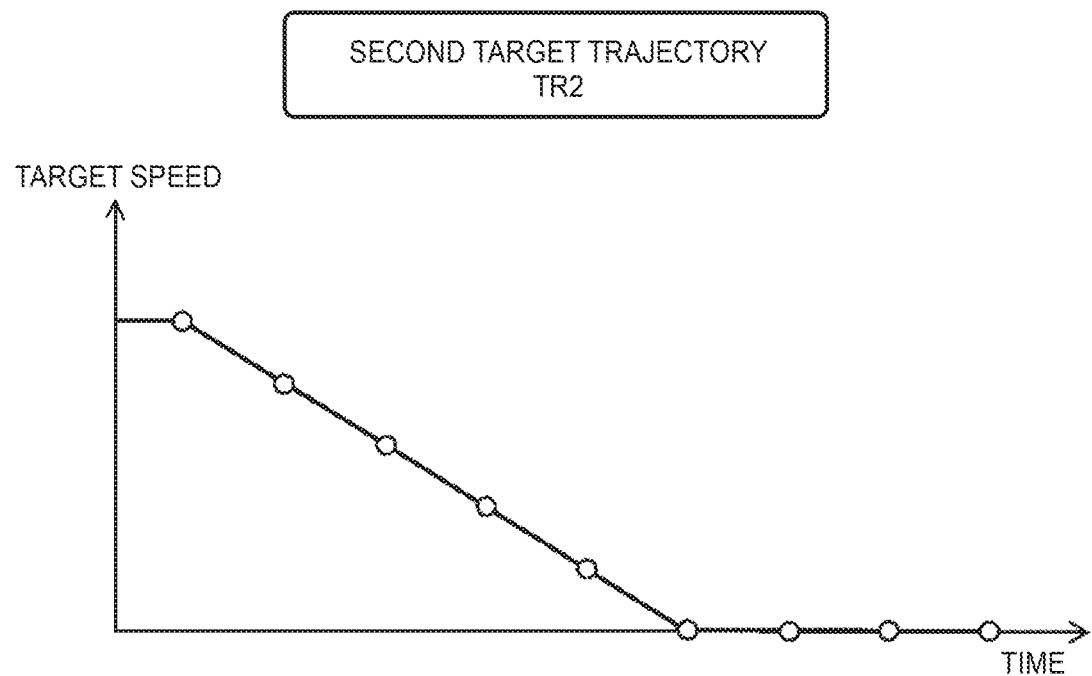
FIG. 3 is a conceptual diagram for describing a second target trajectory according to the first embodiment of the present disclosure.

FIG. 3 is a conceptual diagram for describing the second target trajectory TR2. The horizontal axis represents the time t, and the vertical axis represents the target speed [VX(t), VY(t)]. As illustrated in FIG. 3, the target speed [VX(t), VY(t)] decreases along with elapse of the time t, and finally reaches zero. The vehicle 1 decelerates and stops by executing the vehicle traveling control based on the second target trajectory TR2. The second target trajectory TR2 may request steering in addition to the deceleration. For example, the second target trajectory TR2 may be generated such that the vehicle 1 travels to and stops at a road shoulder in a limp home mode.

The target trajectory generation device 100 generates and outputs the first target trajectory TR1 and the second target trajectory TR2. The vehicle traveling control device 200 receives and stores the first target trajectory TR1 and the second target trajectory TR2. The vehicle traveling control device 200 executes the vehicle traveling control based on at least one of the first target trajectory TR1 and the second target trajectory TR2.

In particular, the vehicle traveling control device 200 according to this embodiment selectively uses the first target trajectory TR1 and the second target trajectory TR2 depending on whether the target trajectory generation device 100 malfunctions. When the target trajectory generation device 100 malfunctions, an appropriate target trajectory TR is not output from the target trajectory generation device 100. For example, the generation (update) and output of the target trajectory TR halt when the target trajectory generation device 100 malfunctions. Even if the target trajectory TR is generated and output, the target trajectory TR is inappropriate.

First, it is assumed that the target trajectory generation device 100 is normal (does not malfunction). In this case, the target trajectory generation device 100 generates and outputs the first target trajectory TR1 and the second target trajectory TR2. The vehicle traveling control device 200 executes the vehicle traveling control based on the first target trajectory TR1. That is, the vehicle traveling control device 200 executes the vehicle traveling control such that the vehicle 1 follows the first target trajectory TR1.

Figure 4:
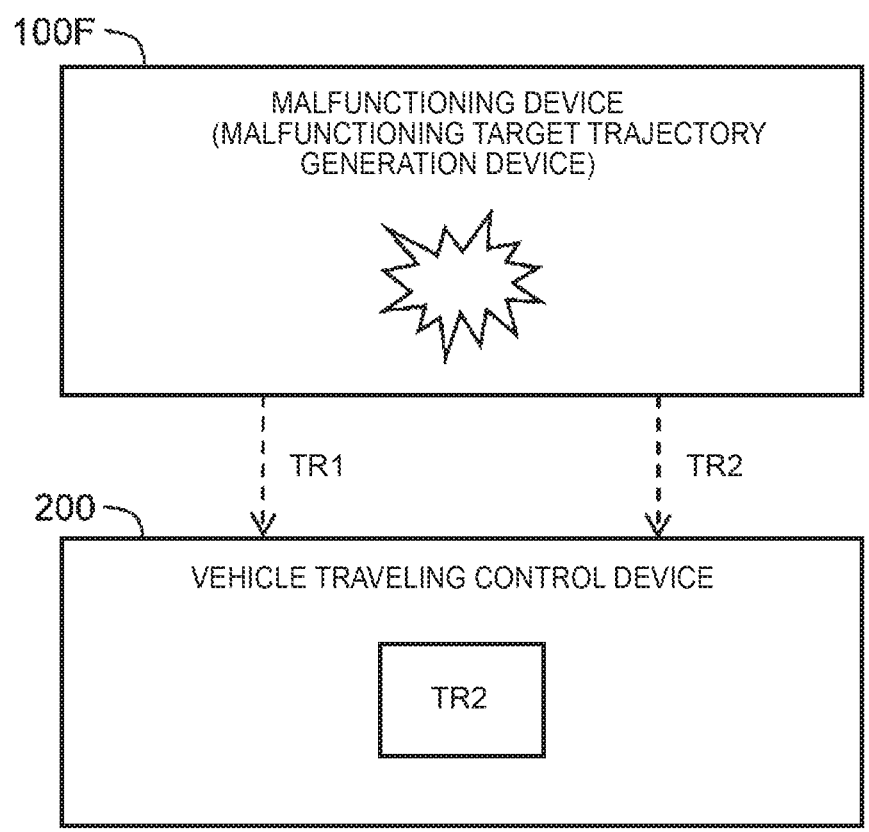
FIG. 4 is a conceptual diagram for describing vehicle traveling control to be executed by the vehicle control system according to the first embodiment of the present disclosure.

Next, referring to FIG. 4, it is assumed that the target trajectory generation device 100 malfunctions. The malfunctioning target trajectory generation device 100 is hereinafter referred to as a "malfunctioning device 100F". After the malfunction occurs, an appropriate target trajectory TR is not output from the malfunctioning device 100F. Without an appropriate target trajectory TR, the safety of vehicle traveling may be lost.

According to this embodiment, when the malfunctioning device 100F exists, an appropriate second target trajectory TR2 before the malfunction is used. That is, the vehicle traveling control device 200 executes the vehicle traveling control based on the second target trajectory TR2 output from the target trajectory generation device 100 before the malfunction occurs. The vehicle 1 decelerates and stops by executing the vehicle traveling control based on the second target trajectory TR2. Thus, the safety of the vehicle 1 is secured.

The second target trajectory TR2 may be regarded as a "testament" prepared by the target trajectory generation device 100 in case of malfunction. The vehicle traveling control device 200 receives and stores in advance the testament output from the target trajectory generation device 100 before malfunction occurs. When the target trajectory generation device 100 malfunctions, the vehicle traveling control device 200 executes the testament received in advance to stop the vehicle 1. Thus, the safety of the vehicle 1 is secured.

The driving environment of the vehicle 1 changes incessantly. When the target trajectory generation device 100 malfunctions, a new second target trajectory TR2 may be used as soon as possible. However, the timing of malfunction in the target trajectory generation device 100 is not known in advance. Therefore, it is appropriate that the target trajectory generation device 100 update and output at least the second target trajectory TR2 "continuously". The term "continuously" is herein a concept including both "constantly" and "intermittently". For example, the output of the second target trajectory TR2 may be suspended for quite a short time. Also in this case, it can be said that the output of the second target trajectory TR2 is continuous over a long period.

It is appropriate that the vehicle traveling control device 200 execute the vehicle traveling control based on the latest second target trajectory TR2 output from the target trajectory generation device 100 for the last time before malfunction occurs. The vehicle 1 can be stopped more appropriately because the latest second target trajectory TR2 reflects the latest driving environment.

The latest second target trajectory TR2 need not be used. For example, a sufficient effect may be attained also when a second target trajectory TR2 that is generated in a previous cycle of the latest is used. The vehicle traveling control device 200 includes a storage device that stores, for a predetermined period, the second target trajectory TR2 output from the target trajectory generation device 100. When the target trajectory generation device 100 malfunctions, the vehicle traveling control device 200 executes the vehicle traveling control by using a relatively new second target trajectory TR2 out of the second target trajectories TR2 output before the malfunction occurs. Thus, the vehicle 1 can be stopped and the safety can be secured.

The vehicle control system 10 according to this embodiment is described below in more detail.

1-2. Configuration Examples

1-2-1. Target Trajectory Generation Device 100

Figure 5:
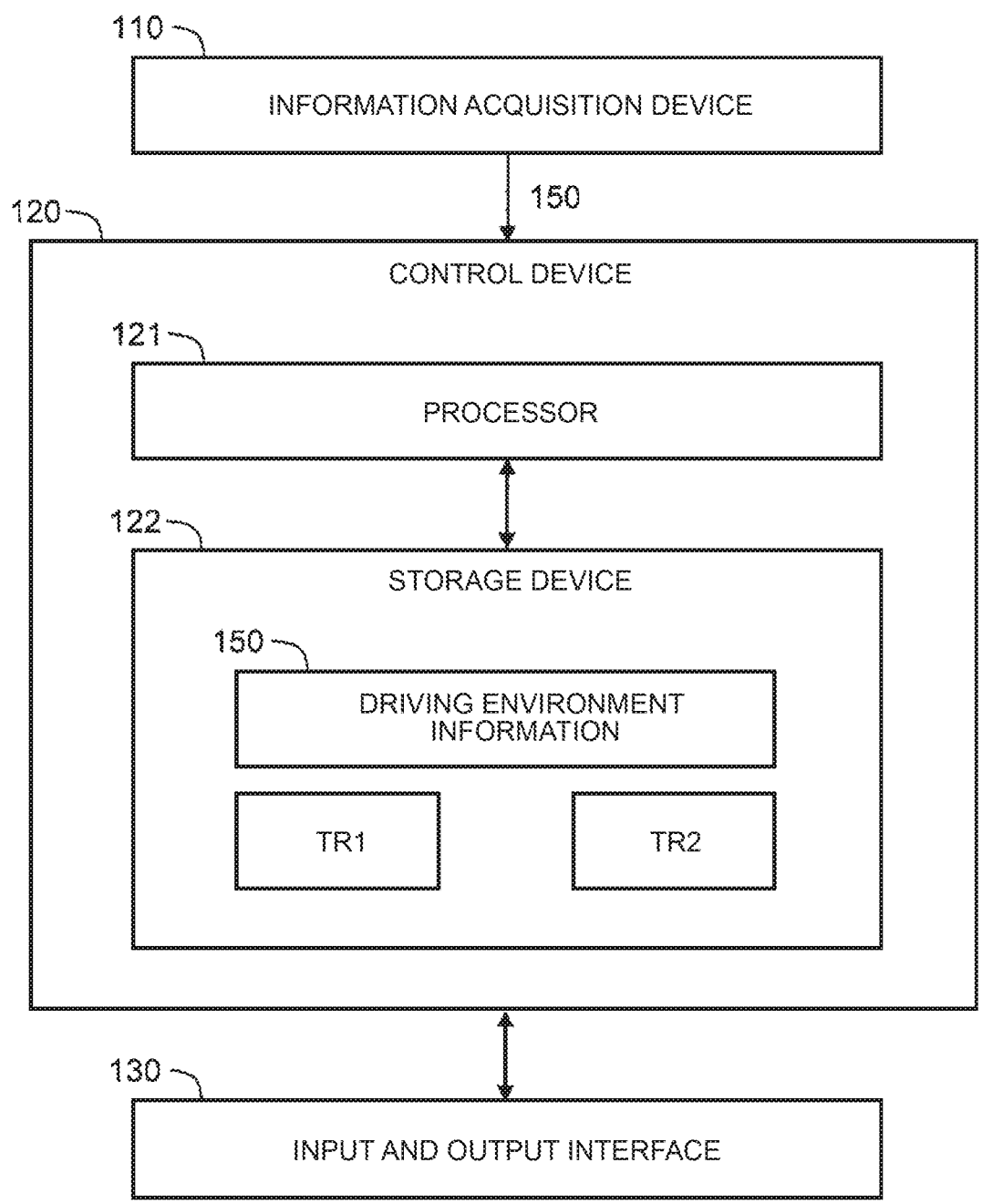
FIG. 5 is a block diagram illustrating an example of the configuration of a target trajectory generation device of the vehicle control system according to the first embodiment of the present disclosure.

FIG. 5 is a block diagram illustrating an example of the configuration of the target trajectory generation device 100 according to this embodiment. The target trajectory generation device 100 includes an information acquisition device 110, a control device 120, and an input and output interface 130.

The information acquisition device 110 acquires the driving environment information 150 indicating the driving environment of the vehicle 1.

Figure 6:
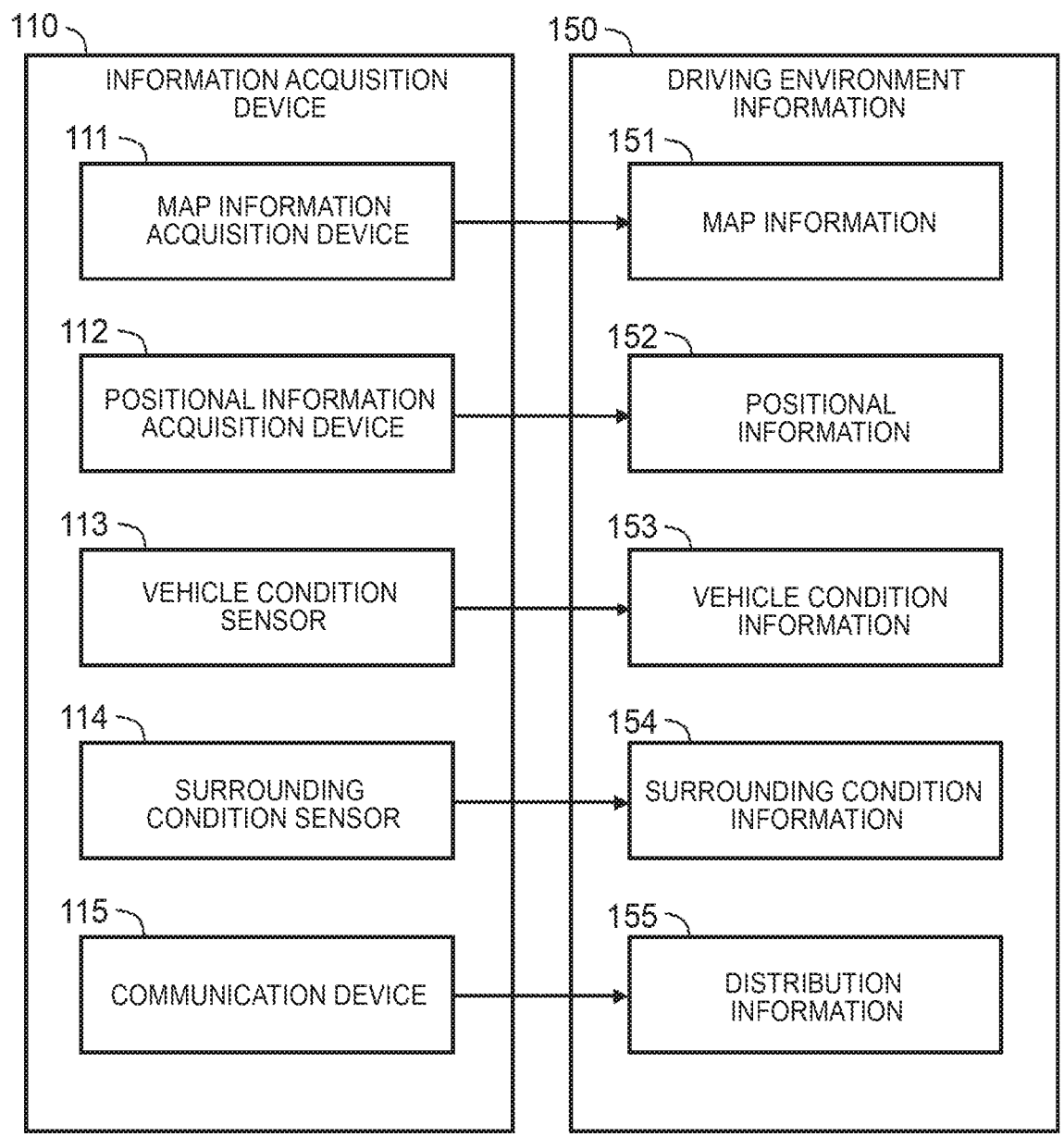
FIG. 6 is a block diagram illustrating examples of an information acquisition device and driving environment information in the target trajectory generation device according to the first embodiment of the present disclosure.

FIG. 6 is a block diagram illustrating examples of the information acquisition device 110 and the driving environment information 150. The information acquisition device 110 includes a map information acquisition device 111, a positional information acquisition device 112, a vehicle condition sensor 113, a surrounding condition sensor 114, and a communication device 115. The driving environment information 150 includes map information 151, positional information 152, vehicle condition information 153, surrounding condition information 154, and distribution information 155.

The map information acquisition device 111 acquires the map information 151. The map information 151 indicates lane arrangements and road shapes. The map information acquisition device 111 acquires map information 151 of a necessary area from a map database. The map database may be stored in a predetermined storage device mounted on the vehicle 1, or in a management server outside the vehicle 1. In the latter case, the map information acquisition device 111 communicates with the management server to acquire necessary map information 151.

The positional information acquisition device 112 acquires the positional information 152 indicating the position and direction of the vehicle 1. For example, the positional information acquisition device 112 includes a Global Positioning System (GPS) device configured to measure the position and direction of the vehicle 1. The positional information acquisition device 112 may increase the accuracy of the positional information 152 through a known self-position estimation process (localization).

The vehicle condition sensor 113 acquires the vehicle condition information 153 indicating conditions of the vehicle 1. For example, the vehicle condition sensor 113 includes a vehicle speed sensor, a yaw rate sensor, an acceleration sensor, and a steering angle sensor. The vehicle speed sensor detects a vehicle speed (speed of the vehicle 1). The yaw rate sensor detects a yaw rate of the vehicle 1. The acceleration sensor detects accelerations of the vehicle 1 (lateral acceleration, longitudinal acceleration, and vertical acceleration). The steering angle sensor detects a steering angle (steered angle) of the vehicle 1.

The surrounding condition sensor 114 recognizes (detects) conditions around the vehicle 1. For example, the surrounding condition sensor 114 includes at least one of a camera, a Laser Imaging Detection and Ranging (LIDAR) sensor, and a radar. The surrounding condition information 154 indicates a result of the recognition by the surrounding condition sensor 114. For example, the surrounding condition information 154 includes target information related to a target recognized by the surrounding condition sensor 114. Examples of the target include a surrounding vehicle, a pedestrian, an object on a roadside, an obstacle, and a lane line (lane marking line). The target information includes information on a relative position and a relative speed of the target to the vehicle 1.

The communication device 115 communicates with the outside of the vehicle 1. For example, the communication device 115 communicates with an external device outside the vehicle 1 via a communication network. The communication device 115 may perform Vehicle-to-Infrastructure (V2I) communication with surrounding infrastructure. The communication device 115 may perform Vehicle-to-Vehicle (V2V) communication with a surrounding vehicle. The distribution information 155 is obtained through the communication device 115. For example, the distribution information 155 includes surrounding vehicle information and traffic information.

A part of the information acquisition device 110 may be included in the vehicle traveling control device 200. That is, the target trajectory generation device 100 and the vehicle traveling control device 200 may share a part of the information acquisition device 110. In this case, the target trajectory generation device 100 and the vehicle traveling control device 200 exchange necessary information.

Referring back to FIG. 5, the input and output interface 130 is communicably connected to the vehicle traveling control device 200. For example, the input and output interface 130 includes a communication device.

The control device 120 (controller) is an information processing device configured to execute various processes. For example, the control device 120 is a microcomputer. The control device 120 is also called an electronic control unit (ECU). The control device 120 includes a processor 121 and a storage device 122.

The storage device 122 stores various types of information. Examples of the storage device 122 include a volatile memory and a non-volatile memory.

The processor 121 executes computer programs. The computer programs are stored in the storage device 122 or recorded in a computer-readable recording medium. The processor 121 executes the computer programs to implement functions of the control device 120 (processor 121).

The control device 120 repeatedly acquires the driving environment information 150 from the information acquisition device 110. The acquired driving environment information 150 is stored in the storage device 122.

The control device 120 determines a traveling plan of the vehicle 1 based on the driving environment information 150, and generates target trajectories TR necessary to achieve the traveling plan. Examples of the traveling plan include a plan to keep a current traveling lane, a plan to change the lane, a plan to avoid an obstacle, and a plan to decelerate and stop. Typically, the control device 120 repeatedly generates the target trajectories TR in each predetermined cycle, that is, updates the target trajectories TR. The generated target trajectories TR (first target trajectory TR1 and second target trajectory TR2) are stored in the storage device 122.

The control device 120 outputs the generated (updated) target trajectories TR to the vehicle traveling control device 200 via the input and output interface 130.

1-2-2. Vehicle Traveling Control Device 200

Figure 7:
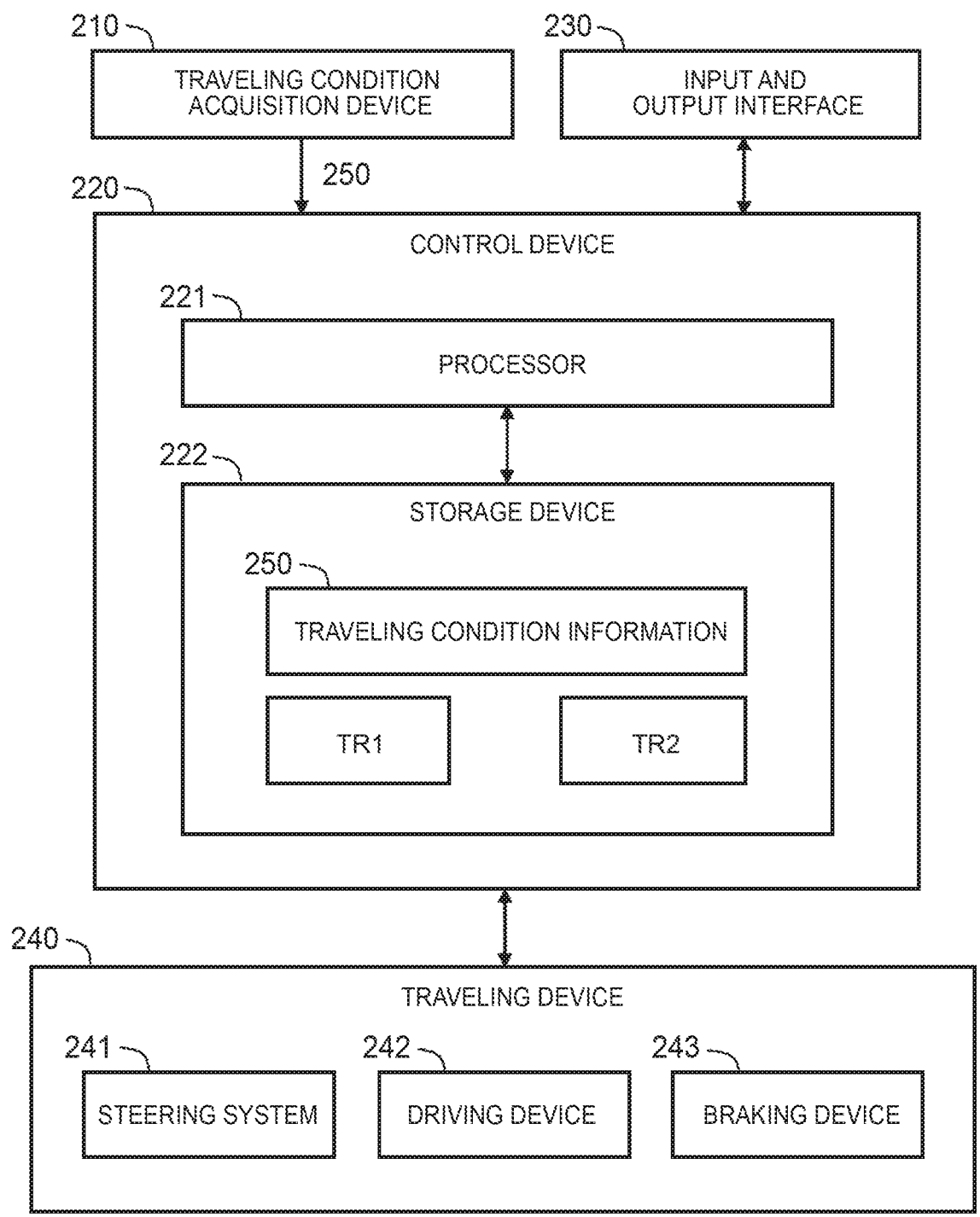
FIG. 7 is a block diagram illustrating an example of the configuration of a vehicle traveling control device of the vehicle control system according to the first embodiment of the present disclosure.

FIG. 7 is a block diagram illustrating an example of the configuration of the vehicle traveling control device 200 according to this embodiment. The vehicle traveling control device 200 includes a traveling condition acquisition device 210, a control device 220, an input and output interface 230, and a traveling device 240.

The traveling condition acquisition device 210 acquires traveling condition information 250 indicating traveling conditions of the vehicle 1. Examples of the traveling condition include a position, a direction, a vehicle speed, a yaw rate, accelerations, and a steering angle (steered angle) of the vehicle 1. For example, the traveling condition acquisition device 210 acquires positional information indicating the position and direction of the vehicle 1 by using a GPS device. The traveling condition acquisition device 210 may increase the accuracy of the positional information through a known self-position estimation process. The traveling condition acquisition device 210 includes a vehicle speed sensor, a yaw rate sensor, an acceleration sensor, and a steering angle sensor. At least a part of the traveling condition acquisition device 210 may be in common with the information acquisition device 110 of the target trajectory generation device 100.

The input and output interface 230 is communicably connected to the target trajectory generation device 100. For example, the input and output interface 230 includes a communication device.

The traveling device 240 includes a steering system 241, a driving device 242, and a braking device 243. The steering system 241 turns wheels of the vehicle 1. Examples of the steering system 241 include an electric power steering (EPS) system. The driving device 242 is a power source configured to generate a driving force. Examples of the driving device 242 include an engine, an electric motor, and an in-wheel motor. The braking device 243 generates a braking force.

The control device 220 (controller) is an information processing device configured to execute various processes. For example, the control device 220 is a microcomputer. The control device 220 is also called an ECU. The control device 220 includes a processor 221 and a storage device 222.

The storage device 222 stores various types of information. Examples of the storage device 222 include a volatile memory and a non-volatile memory.

The processor 221 executes computer programs. The computer programs are stored in the storage device 222 or recorded in a computer-readable recording medium. The processor 221 executes the computer programs to implement functions of the control device 220 (processor 221).

For example, the control device 220 executes the "vehicle traveling control" for controlling steering, acceleration, and deceleration of the vehicle 1. The control device 220 executes the vehicle traveling control by controlling an operation of the traveling device 240. Specifically, the control device 220 controls the steering (turning) of the vehicle 1 by controlling an operation of the steering system 241. The control device 220 controls the acceleration of the vehicle 1 by controlling an operation of the driving device 242. The control device 220 controls the deceleration of the vehicle 1 by controlling an operation of the braking device 243.

The control device 220 repeatedly acquires the traveling condition information 250 from the traveling condition acquisition device 210. The acquired traveling condition information 250 is stored in the storage device 222.

The control device 220 receives, via the input and output interface 230, the target trajectories TR output from the target trajectory generation device 100. The received target trajectories TR (first target trajectory TR1 and second target trajectory TR2) are stored in the storage device 222. After the target trajectories TR are updated, the previous target trajectories TR (in particular, the previous second target trajectory TR2) may be stored in the storage device 222 for a predetermined period.

The control device 220 executes the vehicle traveling control based on the target trajectory TR. Specifically, the control device 220 executes the vehicle traveling control such that the vehicle 1 follows the target trajectory TR. Therefore, the control device 220 calculates deviations between the vehicle 1 and the target trajectory TR based on the target trajectory TR and the traveling condition information 250. Examples of the deviation include a lateral deviation (Y-direction deviation), a yaw angle deviation (azimuth angle deviation), and a speed deviation. The control device 220 executes the vehicle traveling control such that the deviations between the vehicle 1 and the target trajectory TR decrease. Through the vehicle traveling control, the vehicle 1 travels to follow the target trajectory TR.

For example, steering control using the steering system 241 is as follows. The control device 220 calculates a target yaw rate necessary to reduce a deviation between the vehicle 1 and the target trajectory TR. An actual yaw rate is included in the traveling condition information 250. The control device 220 calculates a target steering angle depending on a yaw rate deviation, which is a difference between the target yaw rate and the actual yaw rate. As the yaw rate deviation increases, the target steering angle increases. An actual steering angle is included in the traveling condition information 250. The control device 220 executes feedback control for the steering system 241 such that the actual steering angle equals the target steering angle.

1-3. Example of Malfunction Detection Method

The following are examples of the malfunction in the target trajectory generation device 100.

[Malfunction in Input] The driving environment information 150 necessary to generate the target trajectory TR cannot appropriately be acquired due to an abnormality or failure in the information acquisition device 110 (sensor).

[Malfunction in Arithmetic Process] An arithmetic process for generating the target trajectory TR is not properly executed due to an abnormality or failure in the control device 120.

[Malfunction in Calculation Result] The generated target trajectory TR does not satisfy a predetermined requirement.

[Malfunction in Output] The target trajectory TR is not properly output from the target trajectory generation device 100 due to an abnormality or failure in the output function of the input and output interface 130.

The target trajectory generation device 100 has a self-diagnosis function. The following are examples of items to be checked by using the self-diagnosis function.

[Item 1] The control device 120 is properly operating (for example, the calculation period of the processor 121 falls within a normal range).

[Item 2] The sensors of the information acquisition device 110 are properly operating (for example, sensing periods, detected data counts, and detected data values fall within normal ranges).

[Item 3] The control device 120 successively receives the driving environment information 150 (for example, a reception period and a data amount fall within normal ranges).

[Item 4] The result of calculation of the target trajectory TR is normal (for example, a data amount and a data value fall within normal ranges).

[Item 5] The target trajectory TR is properly output from the input and output interface 130 (for example, a transmission period and a data amount fall within normal ranges).

When an abnormality is detected in any item, the self-diagnosis function determines that the target trajectory generation device 100 malfunctions. When the self-diagnosis function determines that the malfunction occurs, the self-diagnosis function outputs an error signal to the outside via a dedicated signal line. By receiving the error signal, the vehicle traveling control device 200 can recognize the malfunction in the target trajectory generation device 100.

1-4. Processing Flow

Figure 8:
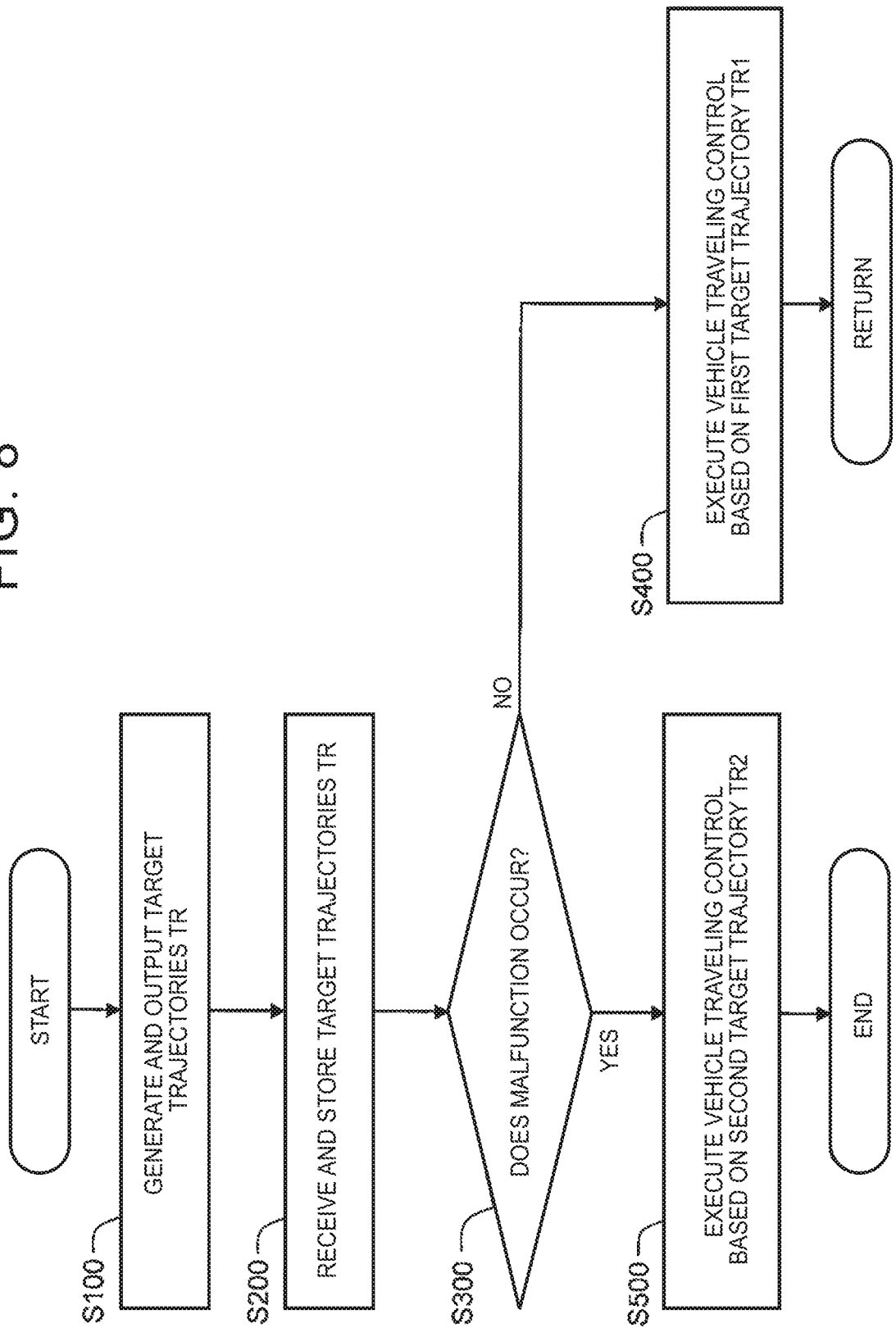
FIG. 8 is a flowchart illustrating a summary of a process to be executed by the vehicle control system according to the first embodiment of the present disclosure.

FIG. 8 is a flowchart illustrating a summary of a process to be executed by the vehicle control system 10 according to this embodiment.

In Step S100, the target trajectory generation device 100 acquires the driving environment information 150. The target trajectory generation device 100 generates (updates) the target trajectories TR based on the driving environment information 150. The target trajectory generation device 100 outputs the generated (updated) target trajectories TR to the vehicle traveling control device 200.

In Step S200, the vehicle traveling control device 200 receives the target trajectories TR output from the target trajectory generation device 100. The vehicle traveling control device 200 stores the received target trajectories TR in the storage device 222.

In Step S300, the vehicle traveling control device 200 determines whether the target trajectory generation device 100 malfunctions. For example, the vehicle traveling control device 200 determines whether the error signal is output from the target trajectory generation device 100. When the target trajectory generation device 100 does not malfunction, that is, when the malfunctioning device 100F does not exist (Step S300; No), the process proceeds to Step S400. When the target trajectory generation device 100 malfunctions, that is, when the malfunctioning device 100F exists (Step S300; Yes), the process proceeds to Step S500.

In Step S400, the vehicle traveling control device 200 executes the vehicle traveling control based on the first target trajectory TR1. That is, the vehicle traveling control device 200 executes the vehicle traveling control such that the vehicle 1 follows the first target trajectory TR1.

In Step S500, the vehicle traveling control device 200 executes the vehicle traveling control based on the second target trajectory TR2. That is, the vehicle traveling control device 200 executes the vehicle traveling control such that the vehicle 1 follows the second target trajectory TR2. Thus, the vehicle 1 decelerates and stops.

1-5. Effects

As described above, the target trajectory generation device 100 according to this embodiment generates and outputs not only the first target trajectory TR1 but also the second target trajectory TR2. The second target trajectory TR2 is a target trajectory TR for decelerating and stopping the vehicle 1. When the malfunctioning device 100F exists, the vehicle traveling control device 200 executes the vehicle traveling control based on the second target trajectory TR2 output from the target trajectory generation device 100 before the malfunction occurs. The vehicle 1 decelerates and stops by executing the vehicle traveling control based on the second target trajectory TR2. Thus, the safety of the vehicle 1 is secured. This operation contributes to improvement in the reliability of the vehicle control system 10.

2. Second Embodiment

In a second embodiment, a plurality of target trajectory generation devices 100 exists. Description overlapping that of the first embodiment is omitted as appropriate.

2-1. Vehicle Control System

Figure 9:
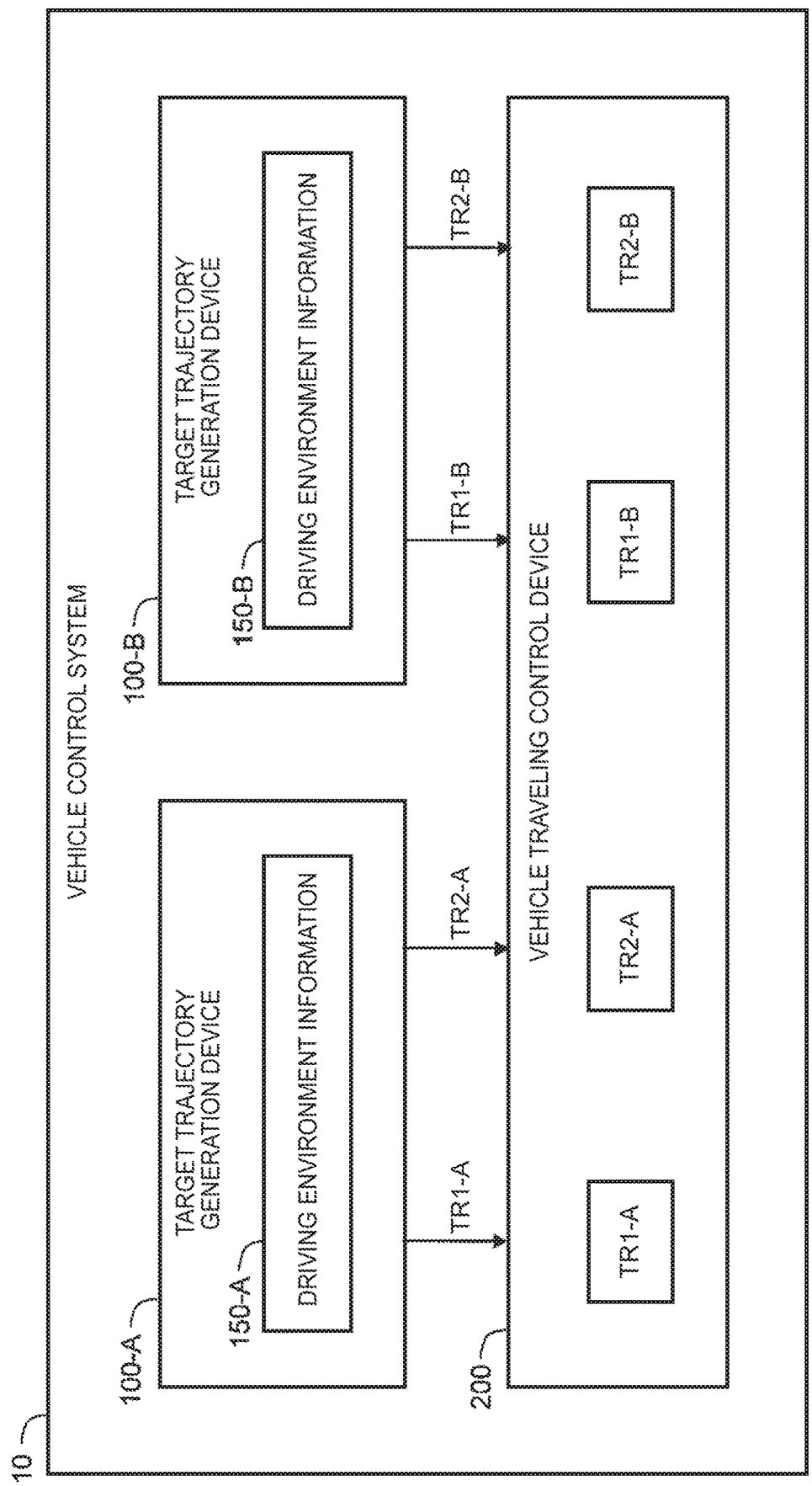
FIG. 9 is a block diagram schematically illustrating the configuration of a vehicle control system according to a second embodiment of the present disclosure.

FIG. 9 is a block diagram schematically illustrating the configuration of a vehicle control system 10 according to the second embodiment. The vehicle control system 10 includes a plurality of target trajectory generation devices 100-A and 100-B and the vehicle traveling control device 200.

The configurations of the target trajectory generation devices 100-A and 100-B are similar to the configuration of the target trajectory generation device 100 described in the first embodiment (see FIG. 5 and FIG. 6).

Regarding the target trajectory generation device 100-A, the driving environment information 150, the target trajectory TR, the first target trajectory TR1, and the second target trajectory TR2 described in the first embodiment are referred to as driving environment information 150-A, a target trajectory TR-A, a first target trajectory TR1-A, and a second target trajectory TR2-A, respectively. The target trajectory generation device 100-A generates and outputs the target trajectories TR-A (TR1-A and TR2-A) based on the driving environment information 150-A.

Regarding the target trajectory generation device 100-B, the driving environment information 150, the target trajectory TR, the first target trajectory TR1, and the second target trajectory TR2 described in the first embodiment are referred to as driving environment information 150-B, a target trajectory TR-B, a first target trajectory TR1-B, and a second target trajectory TR2-B, respectively. The target trajectory generation device 100-B generates and outputs the target trajectories TR-B (TR1-B and TR2-B) based on the driving environment information 150-B.

The configuration of the vehicle traveling control device 200 is similar to the configuration in the first embodiment (see FIG. 7).

2-2. Vehicle Traveling Control

The vehicle traveling control device 200 receives the target trajectories TR-A (TR1-A and TR2-A) output from the target trajectory generation device 100-A. The vehicle traveling control device 200 also receives the target trajectories TR-B (TR1-B and TR2-B) output from the target trajectory generation device 100-B. The vehicle traveling control device 200 stores the received target trajectories TR (TR1-A, TR2-A, TR1-B, and TR2-B) in the storage device 222. The vehicle traveling control device 200 executes the vehicle traveling control based on at least one target trajectory TR.

First, it is assumed that both the target trajectory generation devices 100-A and 100-B are normal, that is, the malfunctioning device 100F does not exist. In this case, the vehicle traveling control device 200 executes the vehicle traveling control based on at least one of the first target trajectories TR1-A and TR1-B. For example, when the first target trajectory TR1-A is output but the first target trajectory TR1-B is not output, the vehicle traveling control device 200 executes the vehicle traveling control based on the first target trajectory TR1-A.

As another example, when both the first target trajectories TR1-A and TR1-B are output, the vehicle traveling control device 200 selects the first target trajectory TR1-A or TR1-B, and executes the vehicle traveling control based on the selected first target trajectory. Alternatively, the vehicle traveling control device 200 may determine a final target trajectory TR by combining the first target trajectories TR1-A and TR1-B, and execute the vehicle traveling control based on the final target trajectory TR.

Figure 10:
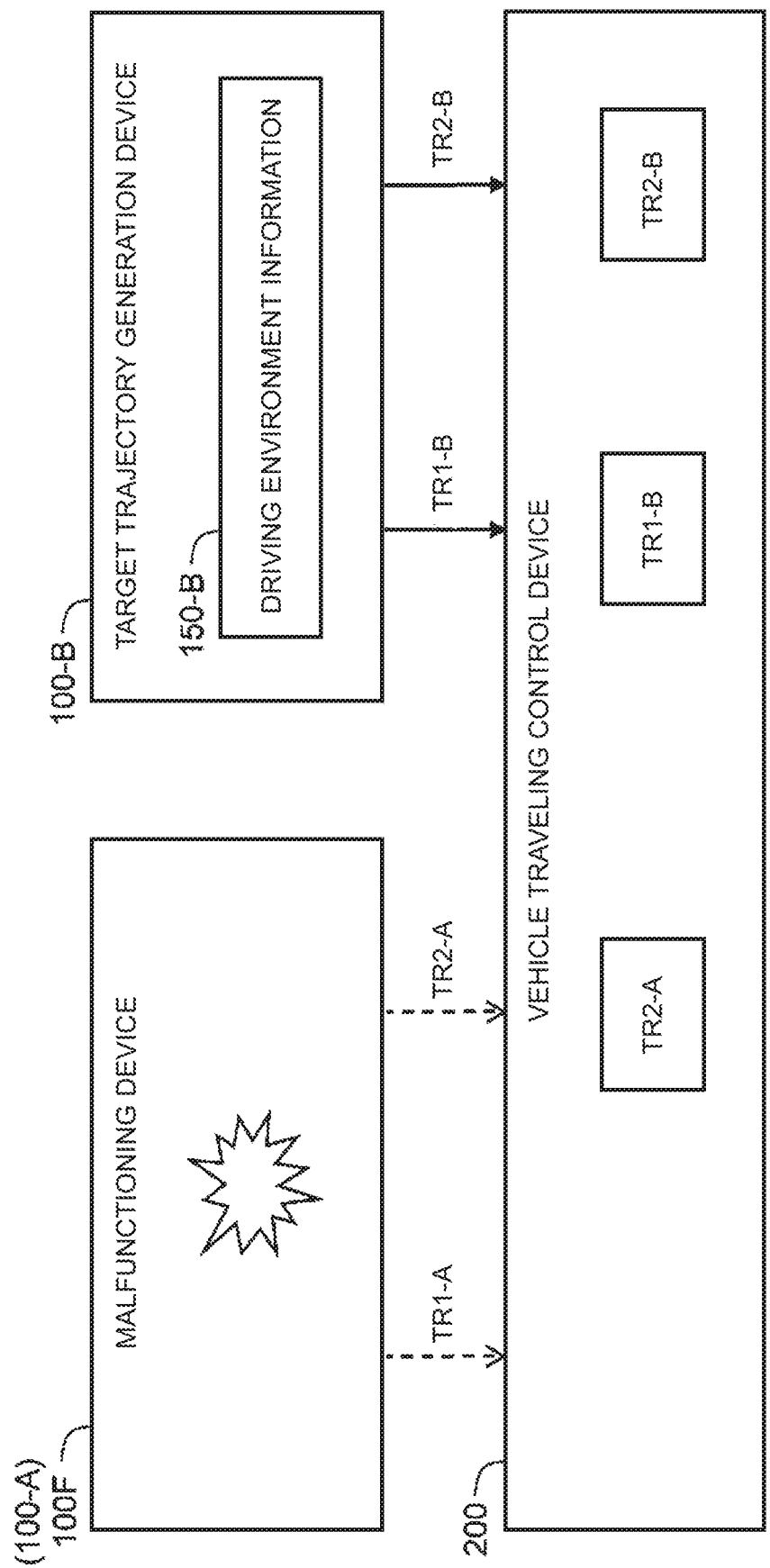
FIG. 10 is a conceptual diagram for describing vehicle traveling control to be executed by the vehicle control system according to the second embodiment of the present disclosure.

Next, referring to FIG. 10, it is assumed that the target trajectory generation device 100-A or 100-B malfunctions, that is, the malfunctioning device 100F exists. In the example illustrated in FIG. 10, the target trajectory generation device 100-A is the malfunctioning device 100F. After the malfunction occurs, appropriate target trajectories TR-A (TR1-A and TR2-A) are not output from the target trajectory generation device 100-A that is the malfunctioning device 100F. In this case, the vehicle traveling control device 200 executes the vehicle traveling control based on the second target trajectory TR2-A or TR2-B to stop the vehicle 1.

For example, the vehicle traveling control device 200 executes the vehicle traveling control based on the second target trajectory TR2-A output from the target trajectory generation device 100-A before the malfunction occurs. Alternatively, the vehicle traveling control device 200 executes the vehicle traveling control based on the second target trajectory TR2-B output from the target trajectory generation device 100-B other than the malfunctioning device 100F. In any case, the vehicle traveling control is executed based on an appropriate second target trajectory TR2, and therefore the vehicle 1 decelerates and stops. Thus, the safety of the vehicle 1 is secured.

2-3. Effects

As described above, when the malfunctioning device 100F exists, the vehicle traveling control device 200 according to this embodiment executes the vehicle traveling control based on the second target trajectory TR2 output from the target trajectory generation device 100-A before the malfunction occurs, or based on the second target trajectory TR2-B output from the target trajectory generation device 100-B other than the malfunctioning device 100F. In any case, the vehicle traveling control is executed based on an appropriate second target trajectory TR2, and therefore the vehicle 1 decelerates and stops. Thus, the safety of the vehicle 1 is secured. This operation contributes to improvement in the reliability of the vehicle control system 10.

3. Third Embodiment

A third embodiment is a specific example of the first embodiment. Description overlapping that of the first embodiment is omitted as appropriate.

3-1. Vehicle Control System

Figure 11:
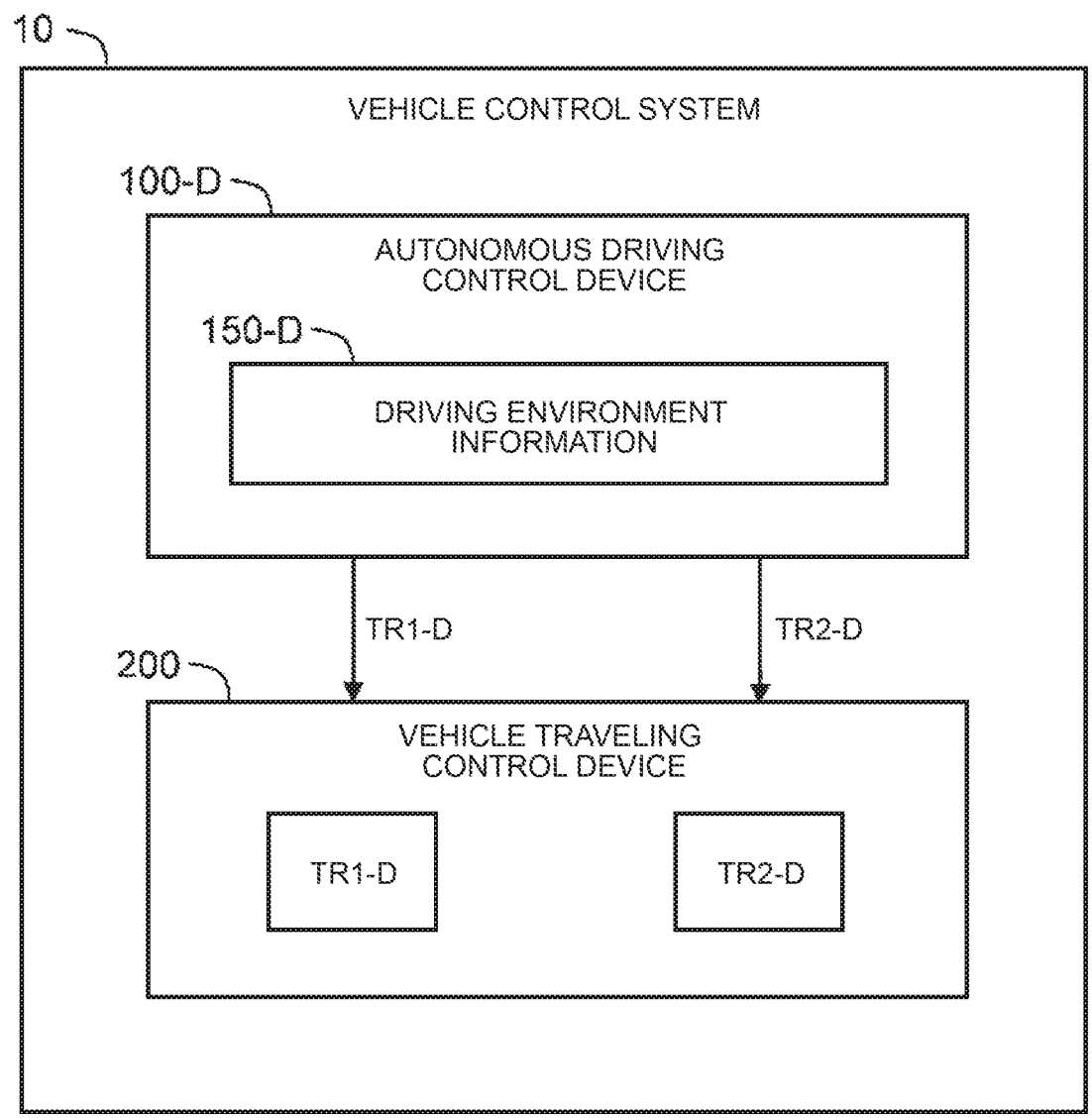
FIG. 11 is a block diagram schematically illustrating the configuration of a vehicle control system according to a third embodiment of the present disclosure.

FIG. 11 is a block diagram schematically illustrating the configuration of a vehicle control system 10 according to the third embodiment. The vehicle control system 10 includes an autonomous driving control device 100-D and the vehicle traveling control device 200.

The autonomous driving control device 100-D is a target trajectory generation device 100 configured to generate a target trajectory TR necessary for autonomous driving of the vehicle 1. The autonomous driving is herein assumed to be autonomous driving in which a driver need not concentrate on driving 100% (for example, so-called Level 3 or higher autonomous driving).

The configuration of the autonomous driving control device 100-D is similar to the configuration of the target trajectory generation device 100 described in the first embodiment (see FIG. 5 and FIG. 6). Regarding the autonomous driving control device 100-D, the driving environment information 150 and the target trajectory TR described in the first embodiment are referred to as driving environment information 150-D and a target trajectory TR-D, respectively.

The autonomous driving control device 100-D generates and outputs the target trajectories TR-D based on the driving environment information 150-D. The target trajectories TR-D include two types of target trajectory, which are an "autonomous driving trajectory TR1-D" and a "limp home trajectory TR2-D" described below.

3-1-1. Autonomous Driving Trajectory TR1-D

The autonomous driving trajectory TR1-D is a first target trajectory TR1 for autonomous driving of the vehicle 1. That is, the autonomous driving trajectory TR1-D is intended to perform at least one of steering, acceleration, and deceleration for the autonomous driving of the vehicle 1.

The autonomous driving control device 100-D creates a traveling plan of the vehicle 1 during the autonomous driving based on the driving environment information 150-D. Examples of the traveling plan include a plan to keep a current traveling lane, a plan to change the lane, and a plan to avoid an obstacle. The autonomous driving control device 100-D generates, as the autonomous driving trajectory TR1-D, a first target trajectory TR1 necessary for the vehicle 1 to travel in accordance with the traveling plan.

For example, the autonomous driving control device 100-D generates an autonomous driving trajectory TR1-D for keeping a current traveling lane. More specifically, the autonomous driving control device 100-D recognizes a traveling lane where the vehicle 1 is traveling based on the map information 151 and the positional information 152, and acquires the arrangement and shape of the traveling lane ahead of the vehicle 1. Alternatively, the autonomous driving control device 100-D may recognize the arrangement and shape of the traveling lane ahead of the vehicle 1 by recognizing a lane marking line (lane line) of the traveling lane based on the surrounding condition information 154. The autonomous driving control device 100-D generates the autonomous driving trajectory TR1-D for keeping the traveling lane based on the arrangement and shape of the traveling lane ahead of the vehicle 1.

As another example, the autonomous driving control device 100-D may generate an autonomous driving trajectory TR1-D for changing a lane. More specifically, the autonomous driving control device 100-D plans to change a lane to arrive at a destination based on the map information 151, the positional information 152, and the destination. The autonomous driving control device 100-D generates the autonomous driving trajectory TR1-D for changing the lane based on, for example, the map information 151, the positional information 152, the vehicle condition information 153, and the surrounding condition information 154 (conditions of other vehicles). The autonomous driving trajectory TR1-D for changing the lane requests at least steering.

As still another example, the autonomous driving control device 100-D may generate an autonomous driving trajectory TR1-D for avoiding collision between the vehicle 1 and its surrounding object. More specifically, the autonomous driving control device 100-D recognizes an avoidance target ahead of the vehicle 1 (such as a surrounding vehicle or a pedestrian) based on the surrounding condition information 154. The autonomous driving control device 100-D estimates future positions of the vehicle 1 and the avoidance target based on the vehicle condition information 153 and the surrounding condition information 154, and calculates a possibility of collision between the vehicle 1 and the avoidance target. When the possibility of collision between the vehicle 1 and the avoidance target is equal to or higher than a threshold, the autonomous driving control device 100-D generates the autonomous driving trajectory TR1-D for avoiding the collision based on the vehicle condition information 153 and the surrounding condition information 154. The autonomous driving trajectory TR1-D for avoiding the collision requests at least one of steering and deceleration.

The autonomous driving control device 100-D repeatedly generates the autonomous driving trajectory TR1-D in each predetermined cycle, that is, updates the autonomous driving trajectory TR1-D. It is appropriate that the autonomous driving control device 100-D update and output the autonomous driving trajectory TR1-D "continuously". The term "continuously" is herein a concept including both "constantly" and "intermittently". For example, the output of the autonomous driving trajectory TR1-D may be suspended for quite a short time. Also in this case, it can be said that the output of the autonomous driving trajectory TR1-D is continuous in the long term.

3-1-2. Limp Home Trajectory TR2-D

Figure 12:
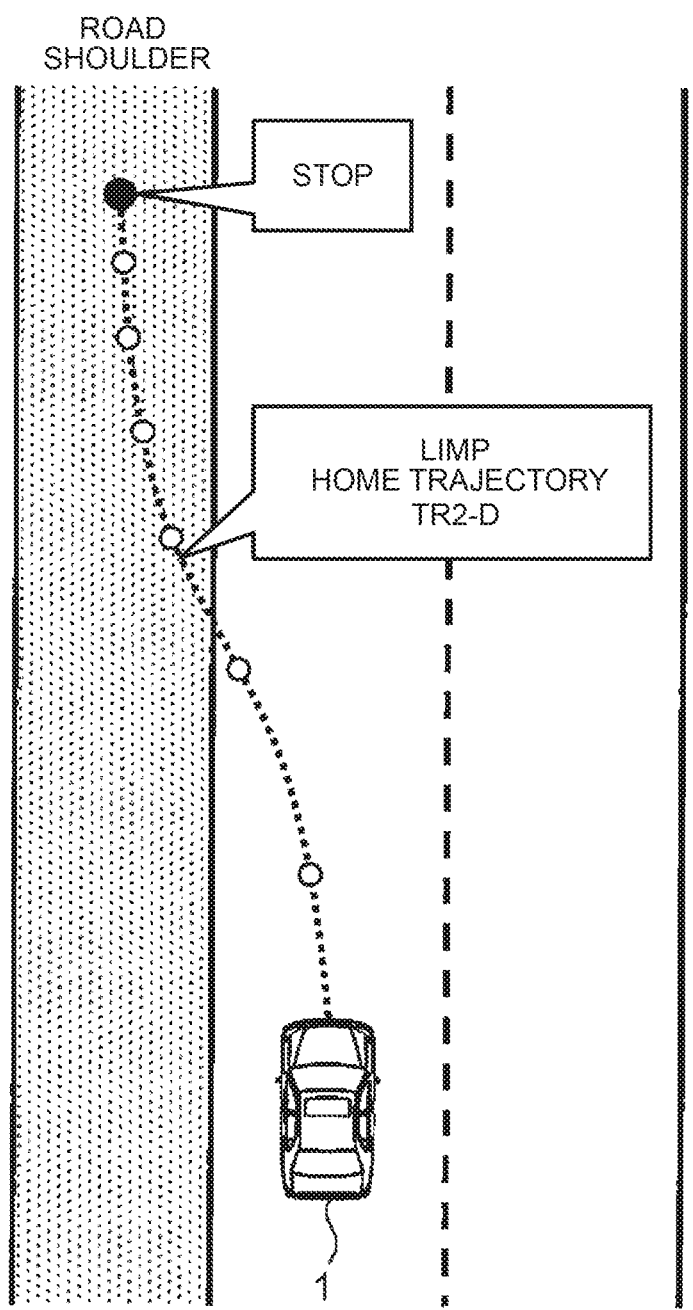
FIG. 12 is a conceptual diagram for describing a limp home trajectory according to the third embodiment of the present disclosure.

FIG. 12 is a conceptual diagram for describing the limp home trajectory TR2-D. The limp home trajectory TR2-D is a second target trajectory TR2 for decelerating and stopping the vehicle 1. In particular, the limp home trajectory TR2-D is a second target trajectory TR2 for causing the vehicle 1 to travel to a safe stopping area in the limp home mode.

In the example illustrated in FIG. 12, the vehicle 1 travels to and stops at a road shoulder in the limp home mode along the limp home trajectory TR2-D. For example, the position of the road shoulder in a stoppable area is registered in advance in the map information 151. Alternatively, the stoppable road shoulder may be detected based on the surrounding condition information 154. That is, the autonomous driving control device 100-D recognizes the stoppable road shoulder based on at least one of the map information 151 and the surrounding condition information 154. The autonomous driving control device 100-D generates the limp home trajectory TR2-D for causing the vehicle 1 to travel to and stop at the road shoulder in the limp home mode. The limp home trajectory TR2-D requests steering and deceleration.

The autonomous driving control device 100-D repeatedly generates the limp home trajectory TR2-D in each predetermined cycle, that is, updates the limp home trajectory TR2-D. It is appropriate that the autonomous driving control device 100-D update and output the limp home trajectory TR2-D "continuously". The term "continuously" is herein a concept including both "constantly" and "intermittently". For example, the output of the limp home trajectory TR2-D may be suspended for quite a short time. Also in this case, it can be said that the output of the limp home trajectory TR2-D is continuous in the long term.

3-2. Vehicle Traveling Control

The vehicle traveling control device 200 receives the autonomous driving trajectory TR1-D and the limp home trajectory TR2-D output from the autonomous driving control device 100-D. The vehicle traveling control device 200 stores the received autonomous driving trajectory TR1-D and the received limp home trajectory TR2-D in the storage device 222. The vehicle traveling control device 200 executes the vehicle traveling control based on the autonomous driving trajectory TR1-D or the limp home trajectory TR2-D.

First, it is assumed that the autonomous driving control device 100-D is normal, that is, the malfunctioning device 100F does not exist. In this case, the vehicle traveling control device 200 executes the vehicle traveling control based on the autonomous driving trajectory TR1-D. That is, the vehicle traveling control device 200 executes the vehicle traveling control such that the vehicle 1 follows the autonomous driving trajectory TR1-D. Thus, desired autonomous driving is achieved.

Next, it is assumed that the autonomous driving control device 100-D malfunctions, that is, the malfunctioning device 100F exists (see FIG. 4). The autonomous driving is impossible after the malfunction occurs. Therefore, the vehicle traveling control device 200 executes the vehicle traveling control based on the limp home trajectory TR2-D output from the autonomous driving control device 100-D before the malfunction occurs. For example, the vehicle traveling control device 200 executes the vehicle traveling control based on a limp home trajectory TR2-D output from the autonomous driving control device 100-D for the last time before the malfunction occurs. Thus, the vehicle 1 stops at a safe position. That is, the safety of the vehicle 1 is secured.

3-3. Effects

As described above, when the autonomous driving control device 100-D malfunctions, the vehicle traveling control device 200 according to this embodiment executes the vehicle traveling control based on the limp home trajectory TR2-D output before the malfunction occurs. Thus, the vehicle 1 can promptly be stopped in a situation in which the autonomous driving is impossible. As a result, the safety of the vehicle 1 is secured. This operation contributes to improvement in the reliability of the vehicle control system 10.

4. Fourth Embodiment

A fourth embodiment is a specific example of the second embodiment above. Description overlapping those of the above embodiments is omitted as appropriate.

4-1. Vehicle Control System

Figure 13:
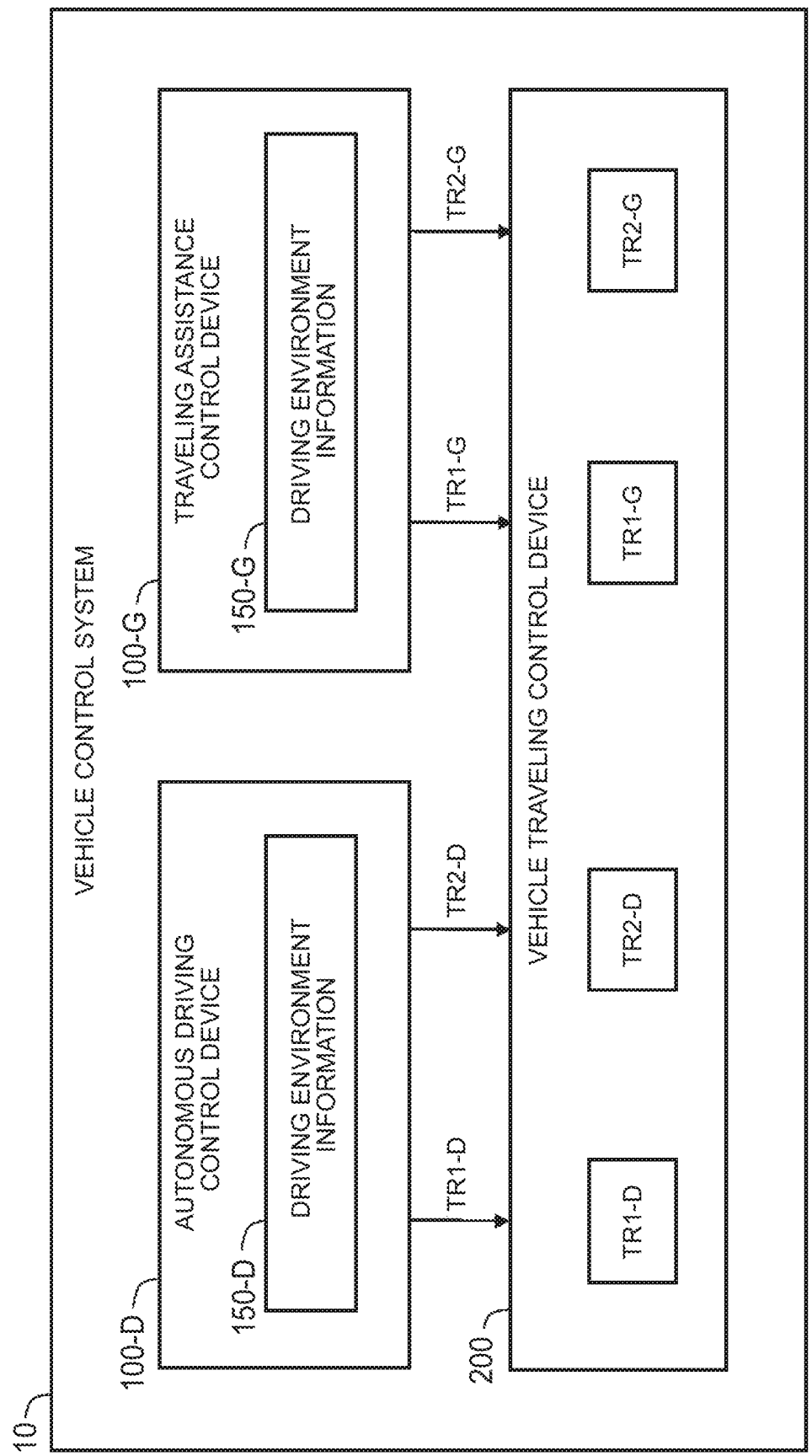
FIG. 13 is a block diagram schematically illustrating the configuration of a vehicle control system according to a fourth embodiment of the present disclosure.

FIG. 13 is a block diagram schematically illustrating the configuration of a vehicle control system 10 according to the fourth embodiment. The vehicle control system 10 includes the autonomous driving control device 100-D, a traveling assistance control device 100-G, and the vehicle traveling control device 200.

The autonomous driving control device 100-D is the same as that described in the third embodiment.

The traveling assistance control device 100-G is a target trajectory generation device 100 configured to generate a target trajectory TR for "traveling assistance control". The traveling of the vehicle 1 is assisted in the traveling assistance control. More specifically, in the traveling assistance control, at least one of steering, acceleration, and deceleration of the vehicle 1 is controlled to improve the safety of the traveling of the vehicle 1 or to stabilize the behavior of the vehicle 1. Examples of the traveling assistance control include collision avoidance control, lane keeping control, and vehicle stability control. In the collision avoidance control, avoidance of collision between the vehicle 1 and its surrounding object (avoidance target) is assisted. The lane keeping control suppresses deviation of the vehicle 1 from a traveling lane. The vehicle stability control suppresses unstable behavior of the vehicle, such as a spin. The traveling assistance control may be regarded as control for reducing risks.

The configuration of the traveling assistance control device 100-G is similar to the configuration of the target trajectory generation device 100 described in the first embodiment (see FIG. 5 and FIG. 6). Regarding the traveling assistance control device 100-G, the driving environment information 150 and the target trajectory TR described in the first embodiment are referred to as driving environment information 150-G and a target trajectory TR-G, respectively. The information acquisition device 110 of the autonomous driving control device 100-D may partially be in common with the information acquisition device 110 of the traveling assistance control device 100-G.

The traveling assistance control device 100-G generates and outputs the target trajectories TR-G based on the driving environment information 150-G. The target trajectories TR-G include two types of target trajectory, which are a "traveling assistance trajectory TR1-G" and an "emergency stop trajectory TR2-G" described below.

4-1-1. Traveling Assistance Trajectory TR1-G

The traveling assistance trajectory TR1-G is a first target trajectory TR1 for the traveling assistance control. That is, the traveling assistance trajectory TR1-G is a first target trajectory TR1 for improving the safety of the traveling of the vehicle 1 or stabilizing the behavior of the vehicle 1.

The traveling assistance control is not constantly executed but executed as necessary. That is, the traveling assistance control is executed only when a predetermined execution condition is satisfied. The traveling assistance control device 100-G determines whether the execution condition is satisfied based on the driving environment information 150-G. When the execution condition is satisfied, the traveling assistance control device 100-G generates and outputs the traveling assistance trajectory TR1-G.

Figure 14:
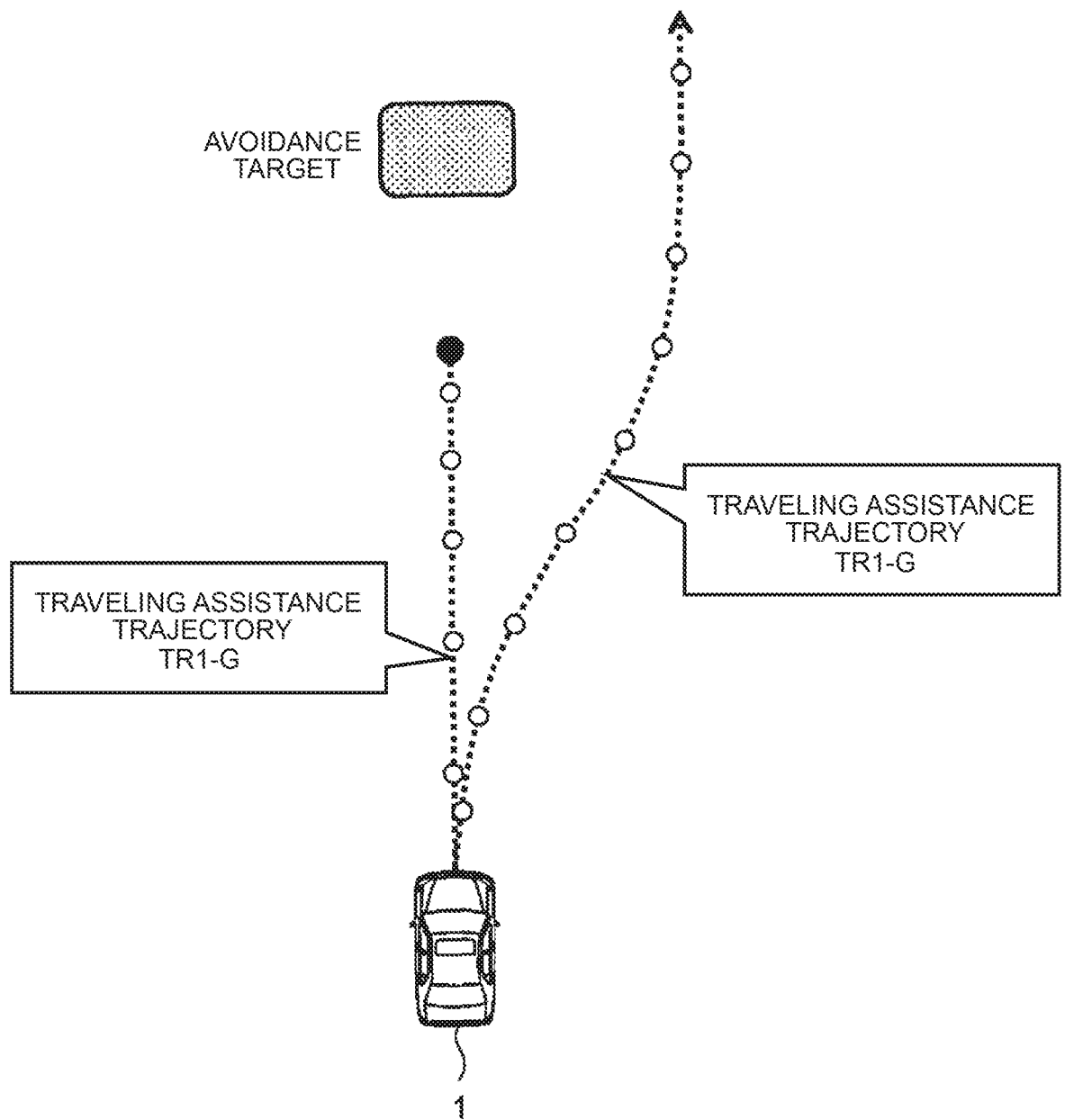
FIG. 14 is a conceptual diagram for describing a traveling assistance trajectory according to the fourth embodiment of the present disclosure.

FIG. 14 illustrates an example of the traveling assistance trajectory TR1-G. The collision avoidance control is assumed as an example of the traveling assistance control. The traveling assistance control device 100-G recognizes an avoidance target ahead of the vehicle 1 (such as a surrounding vehicle or a pedestrian) based on the surrounding condition information 154. The traveling assistance control device 100-G estimates future positions of the vehicle 1 and the avoidance target based on the vehicle condition information 153 and the surrounding condition information 154, and calculates a possibility of collision between the vehicle 1 and the avoidance target. The execution condition for the collision avoidance control is that the possibility of collision between the vehicle 1 and the avoidance target is equal to or higher than a threshold.

When the execution condition for the collision avoidance control is satisfied, the traveling assistance control device 100-G generates the traveling assistance trajectory TR1-G for the collision avoidance control. As illustrated in FIG. 14, the traveling assistance trajectory TR1-G for the collision avoidance control requests at least one of steering and deceleration of the vehicle 1 to avoid the collision with the avoidance target.

The lane keeping control is assumed as another example of the traveling assistance control. For example, when the vehicle 1 wobbles down the traveling lane to approach a lane marking line (lane line) of the traveling lane, the vehicle 1 is steered in the lane keeping control to return to the center of the traveling lane. Therefore, the traveling assistance control device 100-G recognizes the lane marking line of the traveling lane where the vehicle 1 is traveling based on the surrounding condition information 154, and monitors the distance between the vehicle 1 and the lane marking line. A first execution condition for the lane keeping control is that the distance between the vehicle 1 and the lane marking line of the traveling lane is smaller than a predetermined distance threshold. When the first execution condition is satisfied, the traveling assistance control device 100-G generates the traveling assistance trajectory TR1-G that requests steering to return the vehicle 1 to the center of the traveling lane.

In the lane keeping control, the vehicle 1 is decelerated in response to prediction that the vehicle 1 may fail to navigate a curve ahead of the vehicle 1. Therefore, the traveling assistance control device 100-G acquires a road shape ahead of the vehicle 1 based on the map information 151 and the positional information 152. The traveling assistance control device 100-G determines whether the vehicle 1 can navigate the curve ahead of the vehicle 1 without deviating from the traveling lane based on the road shape and the vehicle condition information 153 (such as a vehicle speed). At this time, the traveling assistance control device 100-G may make the determination in consideration of a road condition (coefficient of road friction). The road condition can be estimated by a known technology using the vehicle condition information 153 (such as a vehicle speed or a wheel speed) or the surrounding condition information 154 (such as imaging information). A second execution condition for the lane keeping control is that the vehicle 1 may fail to navigate the curve ahead of the vehicle 1 without deviating from the traveling lane. When the second execution condition is satisfied, the traveling assistance control device 100-G generates the traveling assistance trajectory TR1-G that requests deceleration of the vehicle 1 to suppress the lane deviation at the curve ahead of the vehicle 1.

While the execution condition is satisfied, the traveling assistance control device 100-G may repeatedly generate the traveling assistance trajectory TR1-G in each predetermined cycle, that is, update the traveling assistance trajectory TR1-G.

4-1-2. Emergency Stop Trajectory TR2-G

Figure 15:
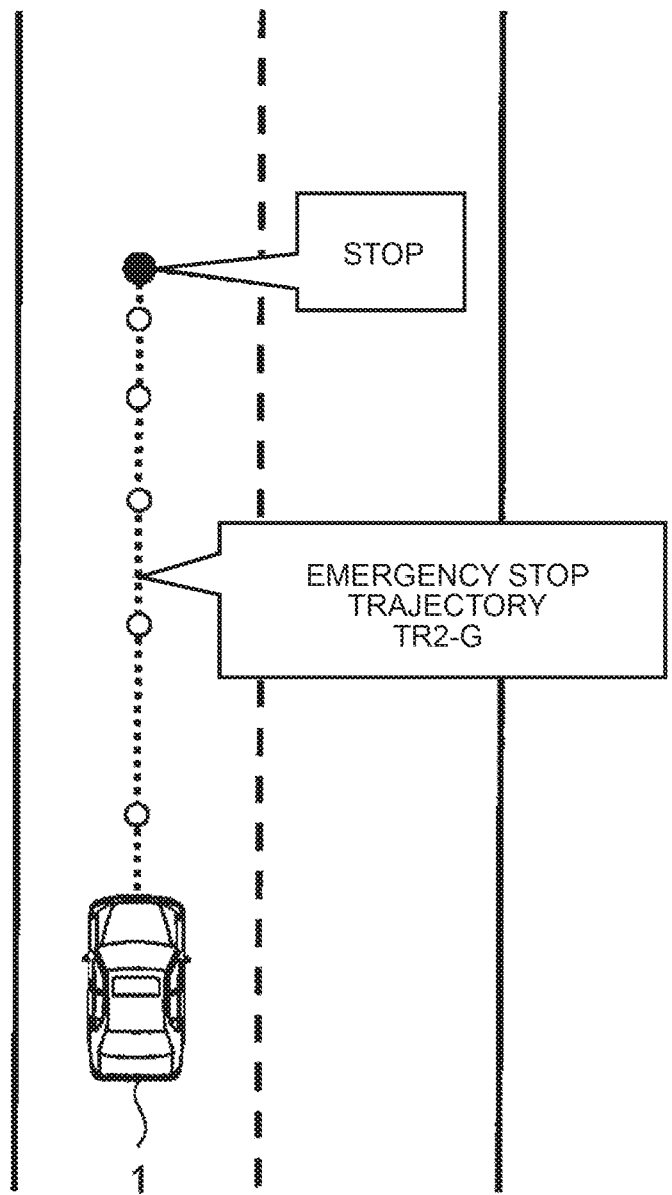
FIG. 15 is a conceptual diagram for describing an emergency stop trajectory according to the fourth embodiment of the present disclosure.

FIG. 15 is a conceptual diagram for describing the emergency stop trajectory TR2-G. The emergency stop trajectory TR2-G is a second target trajectory TR2 for decelerating and stopping the vehicle 1. In particular, the emergency stop trajectory TR2-G is a second target trajectory TR2 for promptly stopping the vehicle 1 in a current traveling lane. In the example illustrated in FIG. 15, the vehicle 1 is promptly stopped along the emergency stop trajectory TR2-G in the current traveling lane without steering.

The traveling assistance control device 100-G repeatedly generates the emergency stop trajectory TR2-G in each predetermined cycle, that is, updates the emergency stop trajectory TR2-G. It is appropriate that the traveling assistance control device 100-G update and output the emergency stop trajectory TR2-G "continuously". The term "continuously" is herein a concept including both "constantly" and "intermittently". For example, the output of the emergency stop trajectory TR2-G may be suspended for quite a short time. Also in this case, it can be said that the output of the emergency stop trajectory TR2-G is continuous in the long term.

4-2. Vehicle Traveling Control

The vehicle traveling control device 200 receives the autonomous driving trajectory TR1-D and the limp home trajectory TR2-D output from the autonomous driving control device 100-D. The vehicle traveling control device 200 also receives the emergency stop trajectory TR2-G output from the traveling assistance control device 100-G. When the execution condition for the traveling assistance control is satisfied, the vehicle traveling control device 200 receives the traveling assistance trajectory TR1-G output from the traveling assistance control device 100-G. The vehicle traveling control device 200 stores the received target trajectories TR (TR1-D, TR2-D, TR1-G, and TR2-G) in the storage device 222. The vehicle traveling control device 200 executes the vehicle traveling control based on at least one target trajectory TR.

Figure 16:
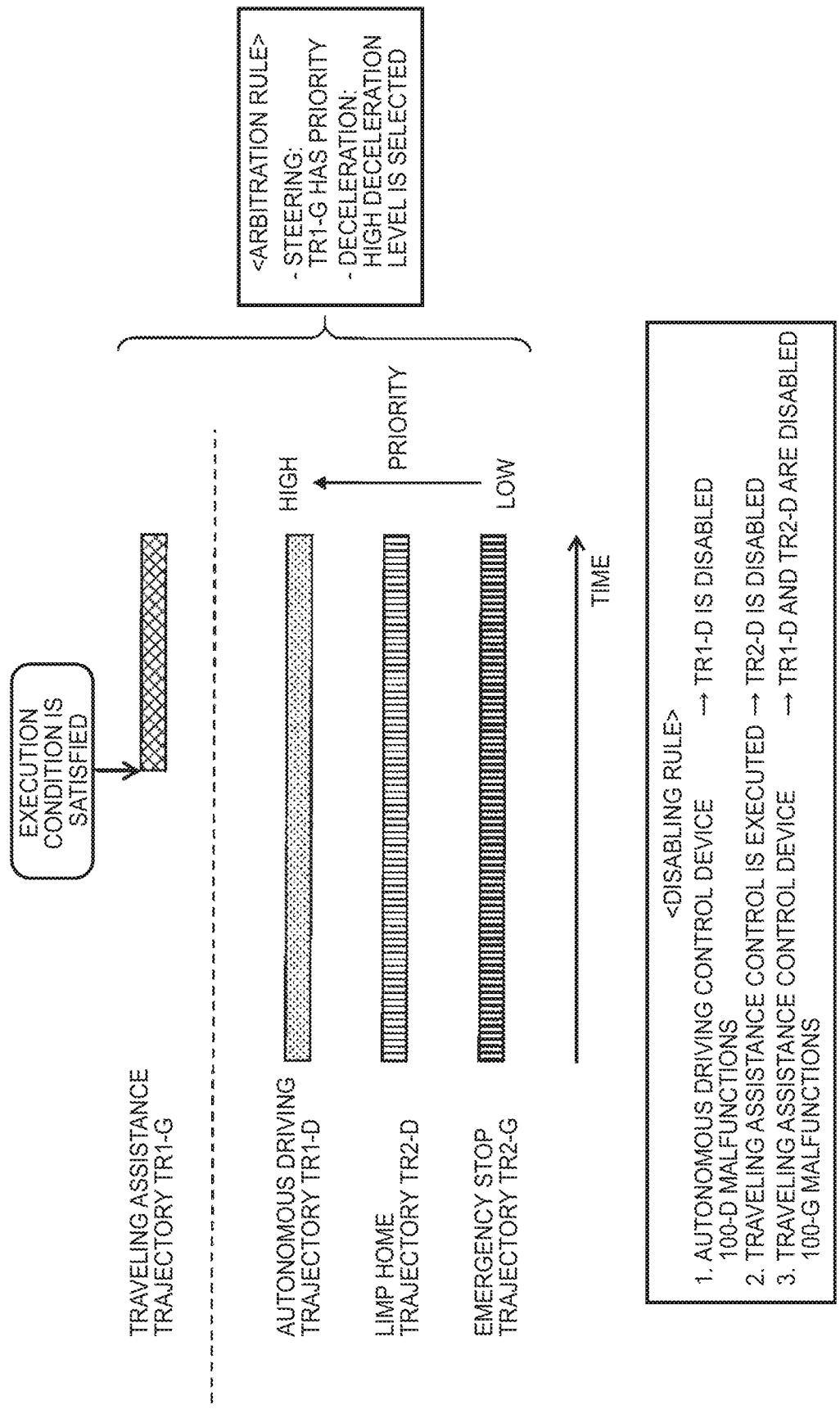
FIG. 16 is a conceptual diagram for describing rules of vehicle traveling control to be executed by the vehicle control system according to the fourth embodiment of the present disclosure.

FIG. 16 is a conceptual diagram for describing rules of the vehicle traveling control of this embodiment.

Disabling Rule

When the autonomous driving control device 100-D malfunctions, the autonomous driving trajectory TR1-D is disabled. Even if the autonomous driving control device 100-D recovers from the malfunction, the autonomous driving trajectory TR1-D remains disabled. When the execution condition for the traveling assistance control is satisfied and the traveling assistance trajectory TR1-G is output, the limp home trajectory TR2-D is disabled. When the traveling assistance control device 100-G malfunctions, the autonomous driving trajectory TR1-D and the limp home trajectory TR2-D are disabled.

Priority Rule

The autonomous driving trajectory TR1-D, the limp home trajectory TR2-D, and the emergency stop trajectory TR2-G have priority levels in descending order. That is, the priority level of the autonomous driving trajectory TR1-D is highest, and the priority level of the emergency stop trajectory TR2-G is lowest.

When the autonomous driving trajectory TR1-D is enabled, the vehicle traveling control is executed based on the autonomous driving trajectory TR1-D. When the autonomous driving trajectory TR1-D is disabled, the vehicle traveling control is executed based on the limp home trajectory TR2-D having the second highest priority level. When both the autonomous driving trajectory TR1-D and the limp home trajectory TR2-D are disabled, the vehicle traveling control is executed based on the emergency stop trajectory TR2-G.

Arbitration Rule

When the execution condition for the traveling assistance control is satisfied and the traveling assistance trajectory TR1-G is output, arbitration between the traveling assistance trajectory TR1-G and the other target trajectory TR (TR1-D or TR2-G) is performed.

In the steering control, the traveling assistance trajectory TR1-G has a higher priority level. That is, the steering control is executed based on the traveling assistance trajectory TR1-G.

In the deceleration control, a target trajectory TR that requests the highest deceleration level has the highest priority level. For example, when the traveling assistance trajectory TR1-G requests a relatively high deceleration level (for example, −1.0 G) and the autonomous driving trajectory TR1-D requests a relatively low deceleration level (for example, −0.5 G), the traveling assistance trajectory TR1-G has a higher priority level. When the autonomous driving trajectory TR1-D requests a relatively high deceleration level (for example, −1.0 G) and the traveling assistance trajectory TR1-G requests a relatively low deceleration level (for example, −0.5 G), the autonomous driving trajectory TR1-D has a higher priority level.

The vehicle traveling control device 200 may report the arbitration result to the autonomous driving control device 100-D and the traveling assistance control device 100-G.

Various examples of the vehicle traveling control in accordance with the rules described above are described below.

4-3. Various Examples of Vehicle Traveling Control

4-3-1. First Example

Figure 17:
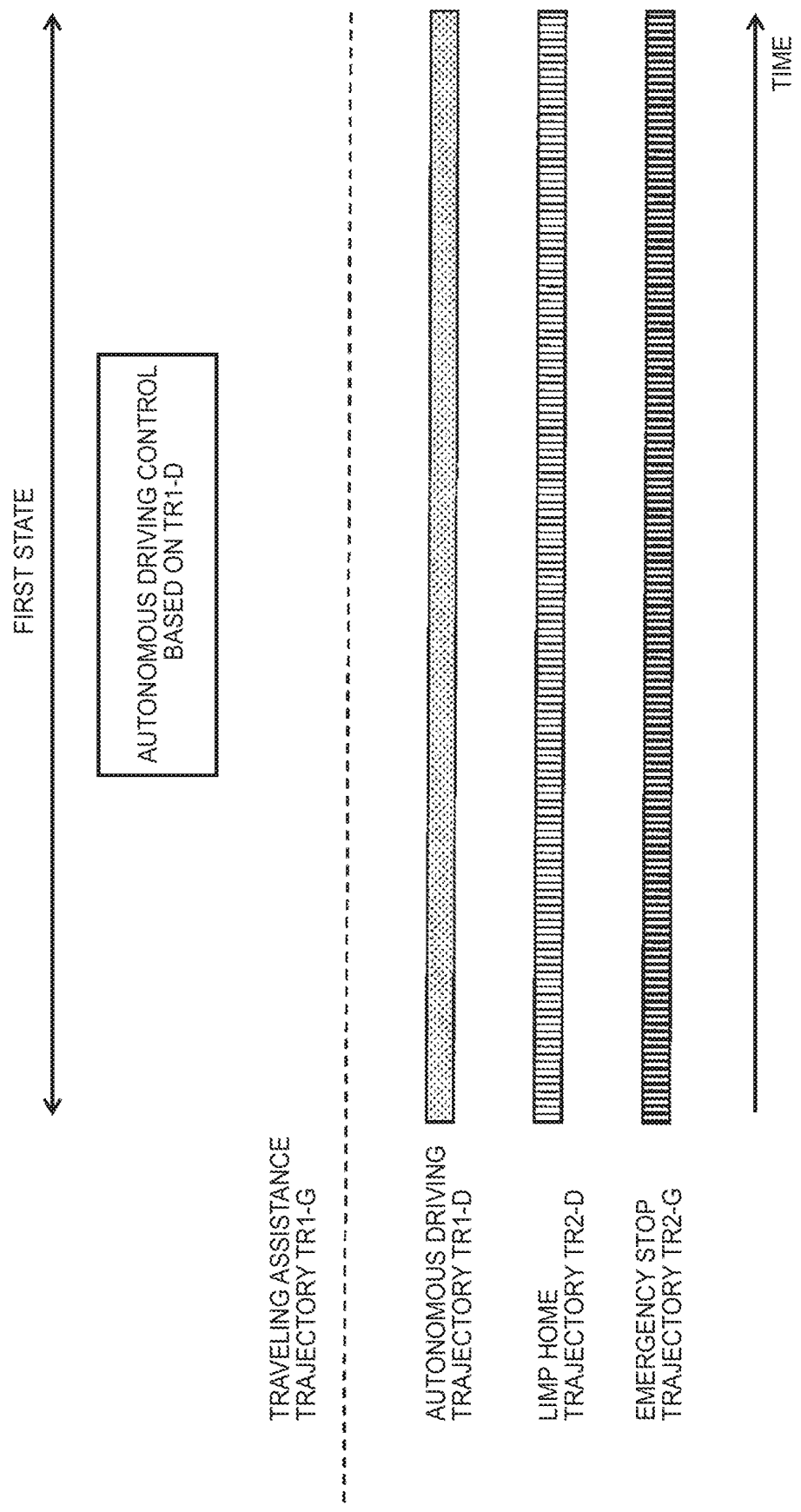
FIG. 17 is a timing chart for describing a first example of the vehicle traveling control to be executed by the vehicle control system according to the fourth embodiment of the present disclosure.

FIG. 17 is a timing chart for describing a first example of the vehicle traveling control according to this embodiment.

In the first example, both the autonomous driving control device 100-D and the traveling assistance control device 100-G are normal, that is, the malfunctioning device 100F does not exist. The autonomous driving control device 100-D generates (updates) and outputs the autonomous driving trajectory TR1-D and the limp home trajectory TR2-D. The traveling assistance control device 100-G generates (updates) and outputs the emergency stop trajectory TR2-G. The execution condition for the traveling assistance control is not satisfied, and the traveling assistance control device 100-G does not output the traveling assistance trajectory TR1-G. This state is hereinafter referred to as a "first state".

In the first state, the priority level of the autonomous driving trajectory TR1-D is highest. Thus, the vehicle traveling control device 200 executes the vehicle traveling control based on the autonomous driving trajectory TR1-D. That is, the vehicle traveling control device 200 executes the vehicle traveling control such that the vehicle 1 follows the autonomous driving trajectory TR1-D.

4-3-2. Second Example

Figure 18:
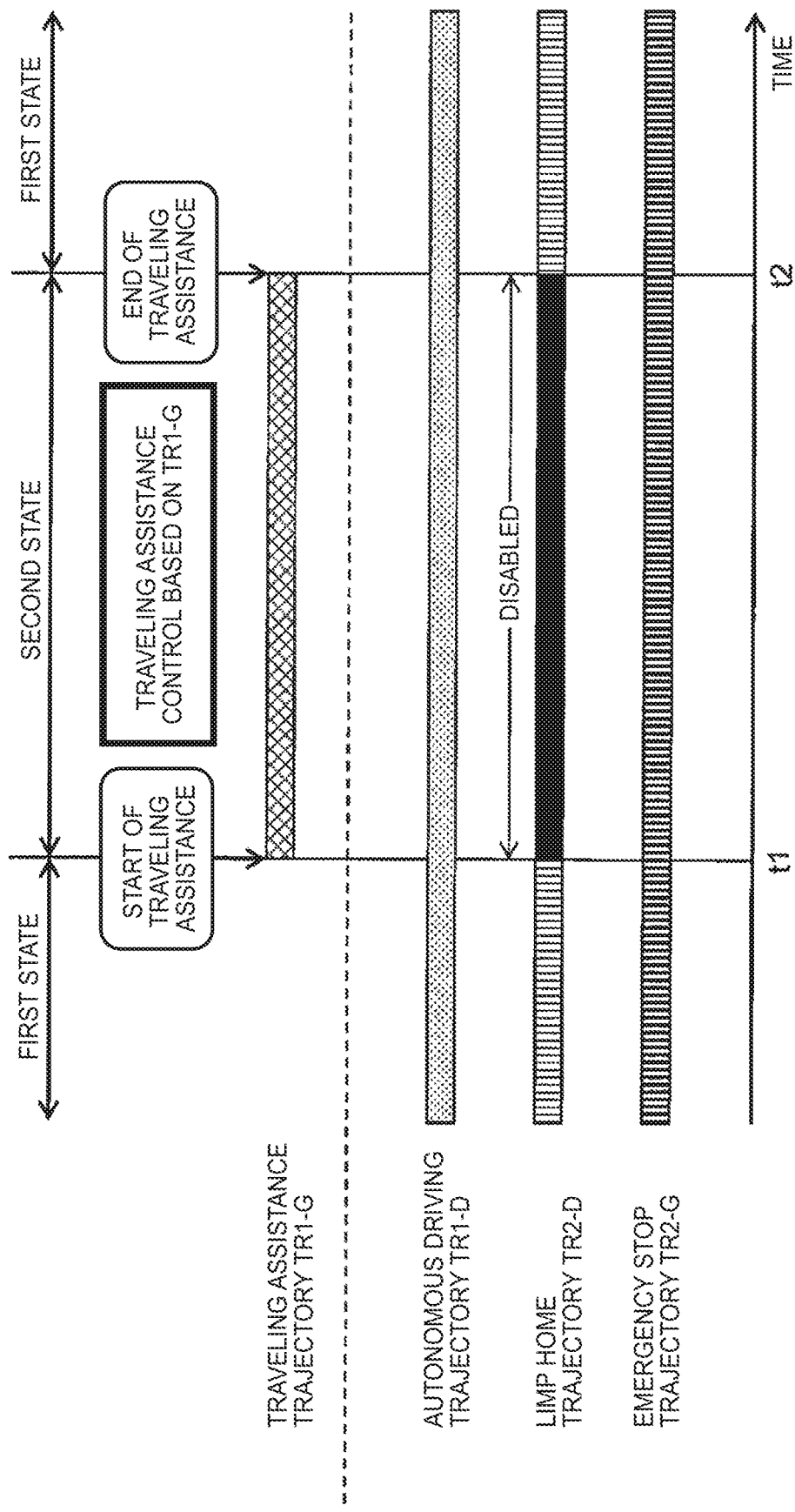
FIG. 18 is a timing chart for describing a second example of the vehicle traveling control to be executed by the vehicle control system according to the fourth embodiment of the present disclosure.

FIG. 18 is a timing chart for describing a second example of the vehicle traveling control according to this embodiment. Description overlapping that of the first example is omitted as appropriate.

The execution condition for the traveling assistance control is satisfied during the first state. The traveling assistance control device 100-G generates and outputs the traveling assistance trajectory TR1-G. This state is hereinafter referred to as a "second state".

In the example illustrated in FIG. 18, a period from a time t1 to a time t2 corresponds to the second state. The traveling assistance control device 100-G reports the start and end of the traveling assistance control to the vehicle traveling control device 200 and the autonomous driving control device 100-D. Based on the report, the vehicle traveling control device 200 recognizes the execution of the traveling assistance control. Also during the execution of the traveling assistance control, the autonomous driving control device 100-D generates (updates) and outputs the autonomous driving trajectory TR1-D and the limp home trajectory TR2-D.

In the second state, the vehicle traveling control device 200 disables the limp home trajectory TR2-D in accordance with the disabling rule described above. The vehicle traveling control device 200 executes the vehicle traveling control based on the autonomous driving trajectory TR1-D and the traveling assistance trajectory TR1-G. More specifically, the vehicle traveling control device 200 performs arbitration between the autonomous driving trajectory TR1-D and the traveling assistance trajectory TR1-G in accordance with the arbitration rule described above, and executes the vehicle traveling control based on the arbitration result.

4-3-3. Third Example

Figure 19:
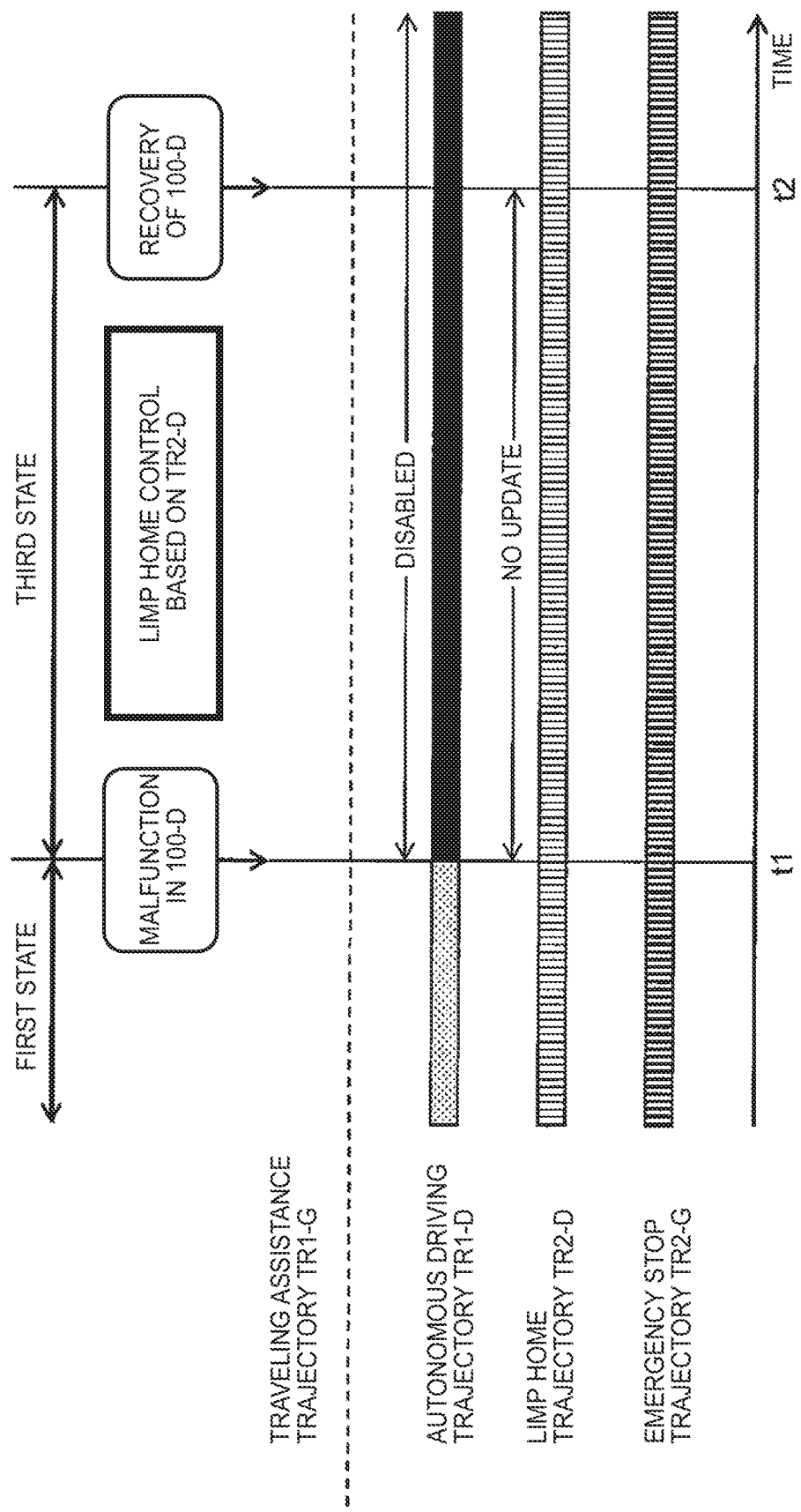
FIG. 19 is a timing chart for describing a third example of the vehicle traveling control to be executed by the vehicle control system according to the fourth embodiment of the present disclosure.

FIG. 19 is a timing chart for describing a third example of the vehicle traveling control according to this embodiment. Description overlapping those of the above examples is omitted as appropriate.

The autonomous driving control device 100-D malfunctions, that is, the autonomous driving control device 100-D is the malfunctioning device 100F during the first state. This state is hereinafter referred to as a "third state".

In the example illustrated in FIG. 19, a period from a time t1 to a time t2 corresponds to the third state. The autonomous driving control device 100-D detects its malfunction, and outputs an error signal to the vehicle traveling control device 200 and the traveling assistance control device 100-G. Based on the error signal, the vehicle traveling control device 200 recognizes the malfunction in the autonomous driving control device 100-D.

In the third state, the vehicle traveling control device 200 disables the autonomous driving trajectory TR1-D in accordance with the disabling rule described above. The vehicle traveling control device 200 executes the vehicle traveling control based on the limp home trajectory TR2-D in accordance with the priority rule described above.

While the autonomous driving control device 100-D malfunctions, the limp home trajectory TR2-D is not appropriately updated or output. Thus, the vehicle traveling control device 200 executes the vehicle traveling control based on a limp home trajectory TR2-D output from the autonomous driving control device 100-D before the malfunction occurs. For example, the vehicle traveling control device 200 executes the vehicle traveling control based on a limp home trajectory TR2-D output from the autonomous driving control device 100-D for the last time before the malfunction occurs. Thus, the vehicle 1 stops at a safe position.

The autonomous driving trajectory TR1-D remains disabled also after the time t2 when the autonomous driving control device 100-D recovers from the malfunction.

4-3-4. Fourth Example

Figure 20:
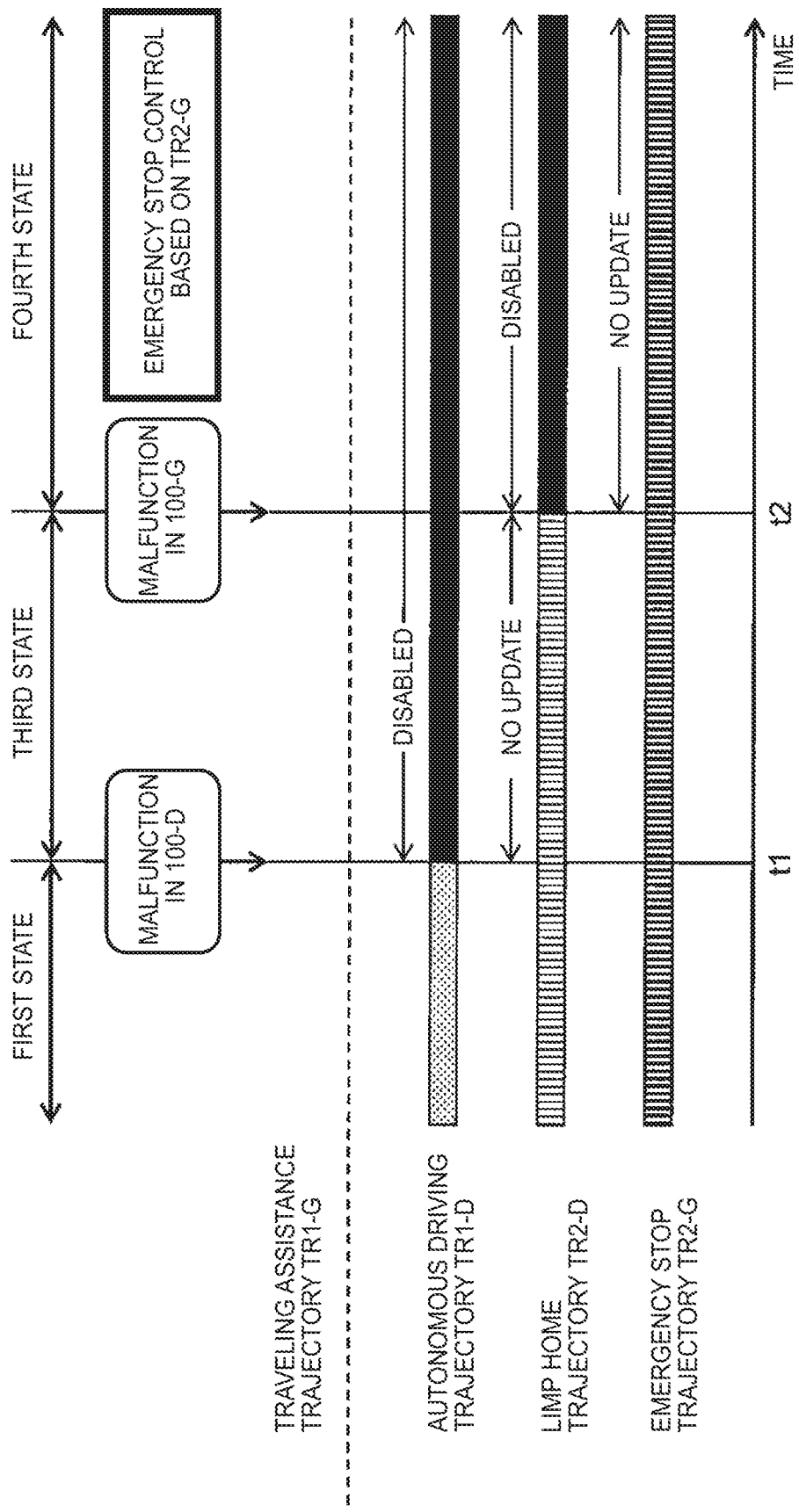
FIG. 20 is a timing chart for describing a fourth example of the vehicle traveling control to be executed by the vehicle control system according to the fourth embodiment of the present disclosure.

FIG. 20 is a timing chart for describing a fourth example of the vehicle traveling control according to this embodiment. Description overlapping those of the above examples is omitted as appropriate.

In the third embodiment above, the traveling assistance control device 100-G also malfunctions, that is, both the autonomous driving control device 100-D and the traveling assistance control device 100-G are the malfunctioning devices 100F during the third state. This state is hereinafter referred to as a "fourth state".

In the example illustrated in FIG. 20, a period after a time t2 corresponds to the fourth state. The traveling assistance control device 100-G detects its malfunction, and outputs an error signal to the vehicle traveling control device 200 and the autonomous driving control device 100-D. Based on the error signal, the vehicle traveling control device 200 recognizes the malfunction in the traveling assistance control device 100-G.

In the fourth state, the vehicle traveling control device 200 disables the autonomous driving trajectory TR1-D and the limp home trajectory TR2-D in accordance with the disabling rule described above. The vehicle traveling control device 200 executes the vehicle traveling control based on the emergency stop trajectory TR2-G in accordance with the priority rule described above.

While the traveling assistance control device 100-G malfunctions, the emergency stop trajectory TR2-G is not appropriately updated or output. Thus, the vehicle traveling control device 200 executes the vehicle traveling control based on an emergency stop trajectory TR2-G output from the traveling assistance control device 100-G before the malfunction occurs. For example, the vehicle traveling control device 200 executes the vehicle traveling control based on an emergency stop trajectory TR2-G output from the traveling assistance control device 100-G for the last time before the malfunction occurs. Thus, the vehicle 1 stops.

4-3-5. Fifth Example

Figure 21:
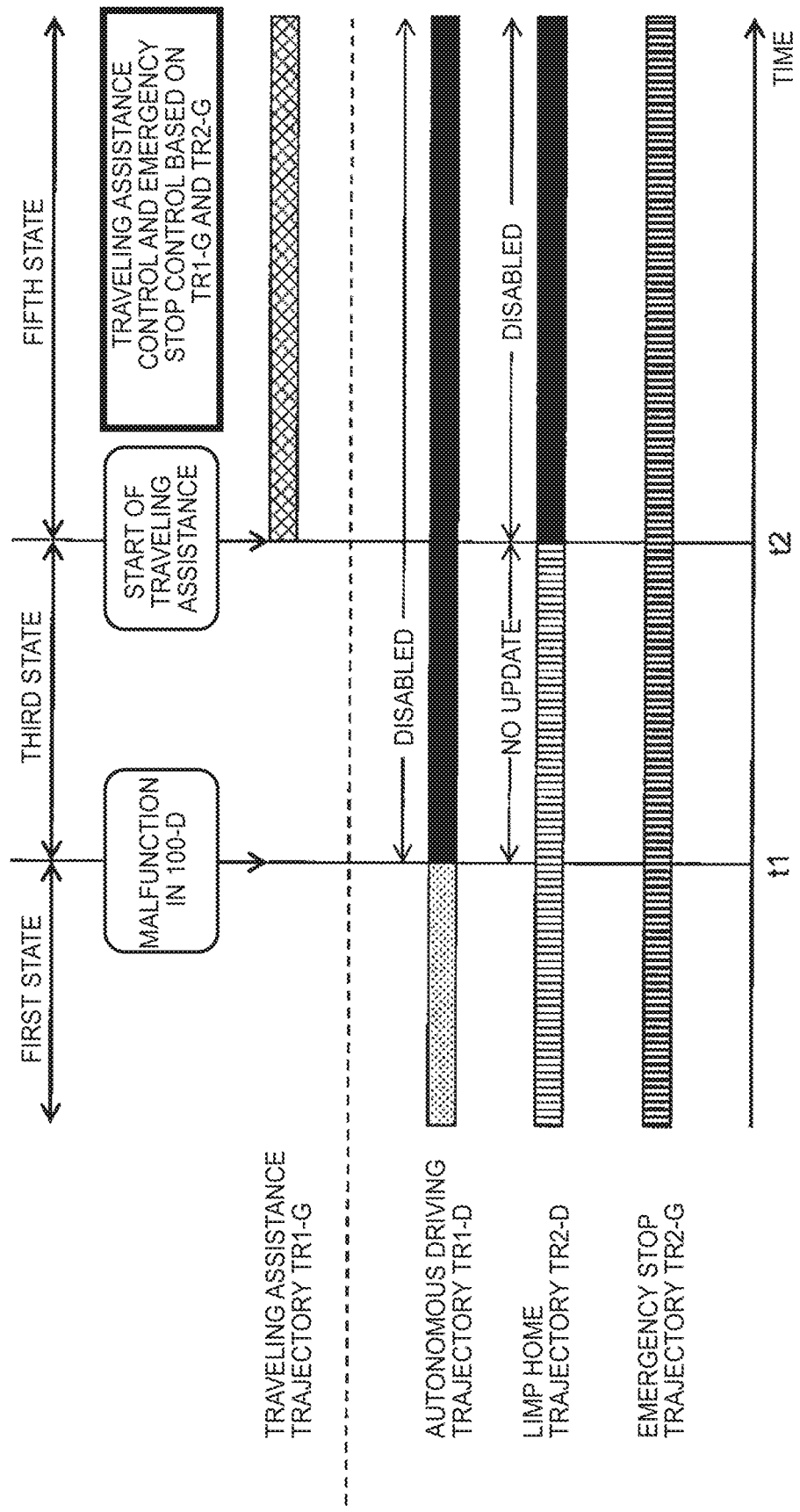
FIG. 21 is a timing chart for describing a fifth example of the vehicle traveling control to be executed by the vehicle control system according to the fourth embodiment of the present disclosure.

FIG. 21 is a timing chart for describing a fifth example of the vehicle traveling control according to this embodiment. Description overlapping those of the above examples is omitted as appropriate.

The execution condition for the traveling assistance control is satisfied during the third state. The traveling assistance control device 100-G generates and outputs the traveling assistance trajectory TR1-G. This state is hereinafter referred to as a "fifth state". In the example illustrated in FIG. 21, a period after a time t2 corresponds to the fifth state.

In the fifth state, the vehicle traveling control device 200 disables the limp home trajectory TR2-D in accordance with the disabling rule described above. The vehicle traveling control device 200 executes the vehicle traveling control based on the emergency stop trajectory TR2-G in accordance with the priority rule described above.

At this time, the traveling assistance trajectory TR1-G is also output. Thus, the vehicle traveling control device 200 executes the vehicle traveling control based on the traveling assistance trajectory TR1-G and the emergency stop trajectory TR2-G output from the traveling assistance control device 100-G. More specifically, the vehicle traveling control device 200 performs arbitration between the traveling assistance trajectory TR1-G and the emergency stop trajectory TR2-G in accordance with the arbitration rule described above, and executes the vehicle traveling control based on the arbitration result. Whether the steering control is executed depends on the traveling assistance trajectory TR1-G, but at least the deceleration control is executed. Thus, the vehicle 1 stops.

4-3-6. Sixth Example

Figure 22:
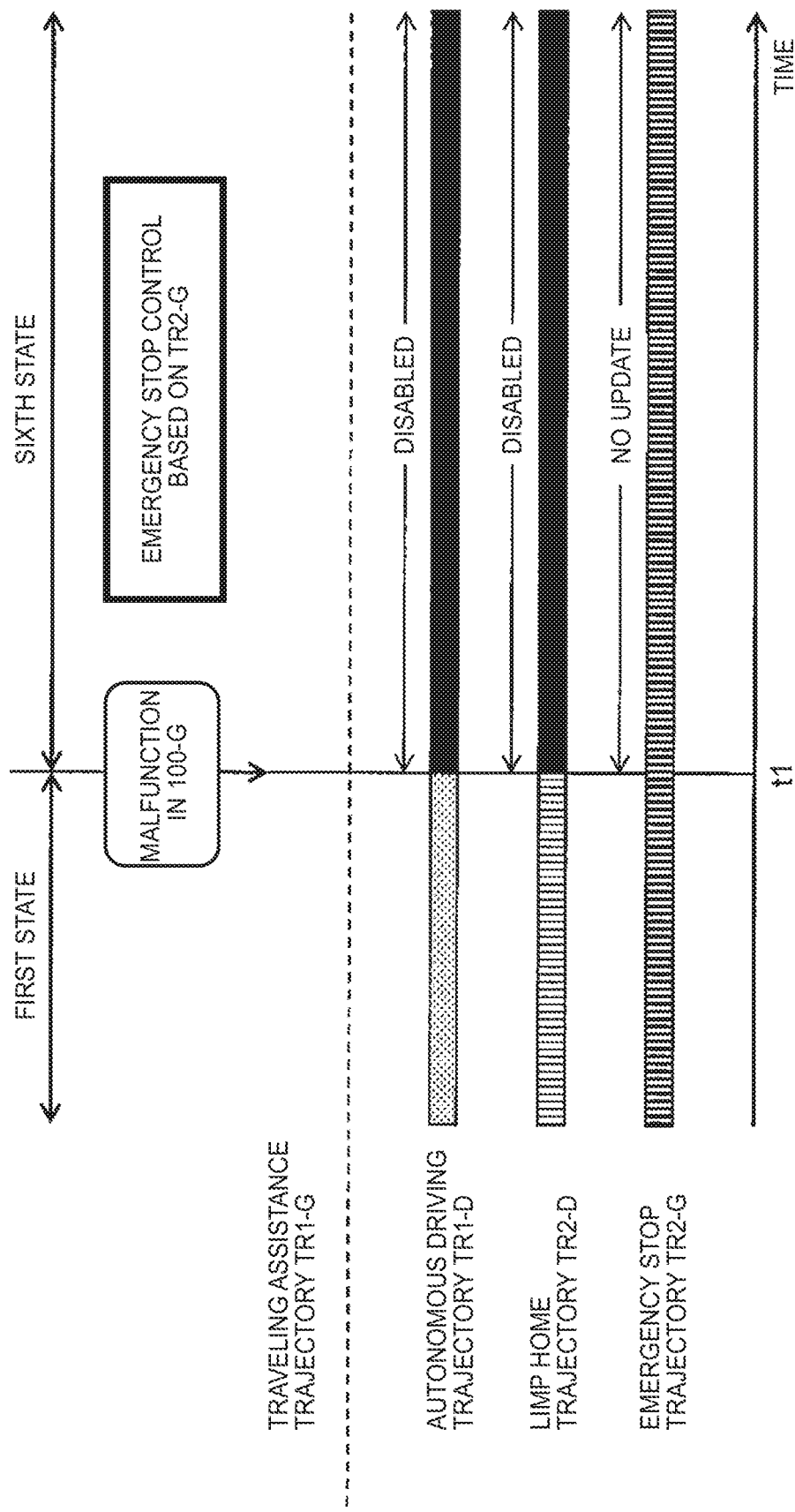
FIG. 22 is a timing chart for describing a sixth example of the vehicle traveling control to be executed by the vehicle control system according to the fourth embodiment of the present disclosure.

FIG. 22 is a timing chart for describing a sixth example of the vehicle traveling control to be executed by the vehicle control system according to this embodiment. Description overlapping those of the above examples is omitted as appropriate.

The traveling assistance control device 100-G malfunctions, that is, the traveling assistance control device 100-G is the malfunctioning device 100F during the first state. This state is hereinafter referred to as a "sixth state". In the example illustrated in FIG. 22, a period after a time t1 corresponds to the sixth state.

In the sixth state, the vehicle traveling control device 200 disables the autonomous driving trajectory TR1-D and the limp home trajectory TR2-D in accordance with the disabling rule described above. The vehicle traveling control device 200 executes the vehicle traveling control based on the emergency stop trajectory TR2-G in accordance with the priority rule described above.

While the traveling assistance control device 100-G malfunctions, the emergency stop trajectory TR2-G is not appropriately updated or output. Thus, the vehicle traveling control device 200 executes the vehicle traveling control based on an emergency stop trajectory TR2-G output from the traveling assistance control device 100-G before the malfunction occurs. For example, the vehicle traveling control device 200 executes the vehicle traveling control based on an emergency stop trajectory TR2-G output from the traveling assistance control device 100-G for the last time before the malfunction occurs. Thus, the vehicle 1 stops.

4-3-7. Seventh Example

Figure 23:
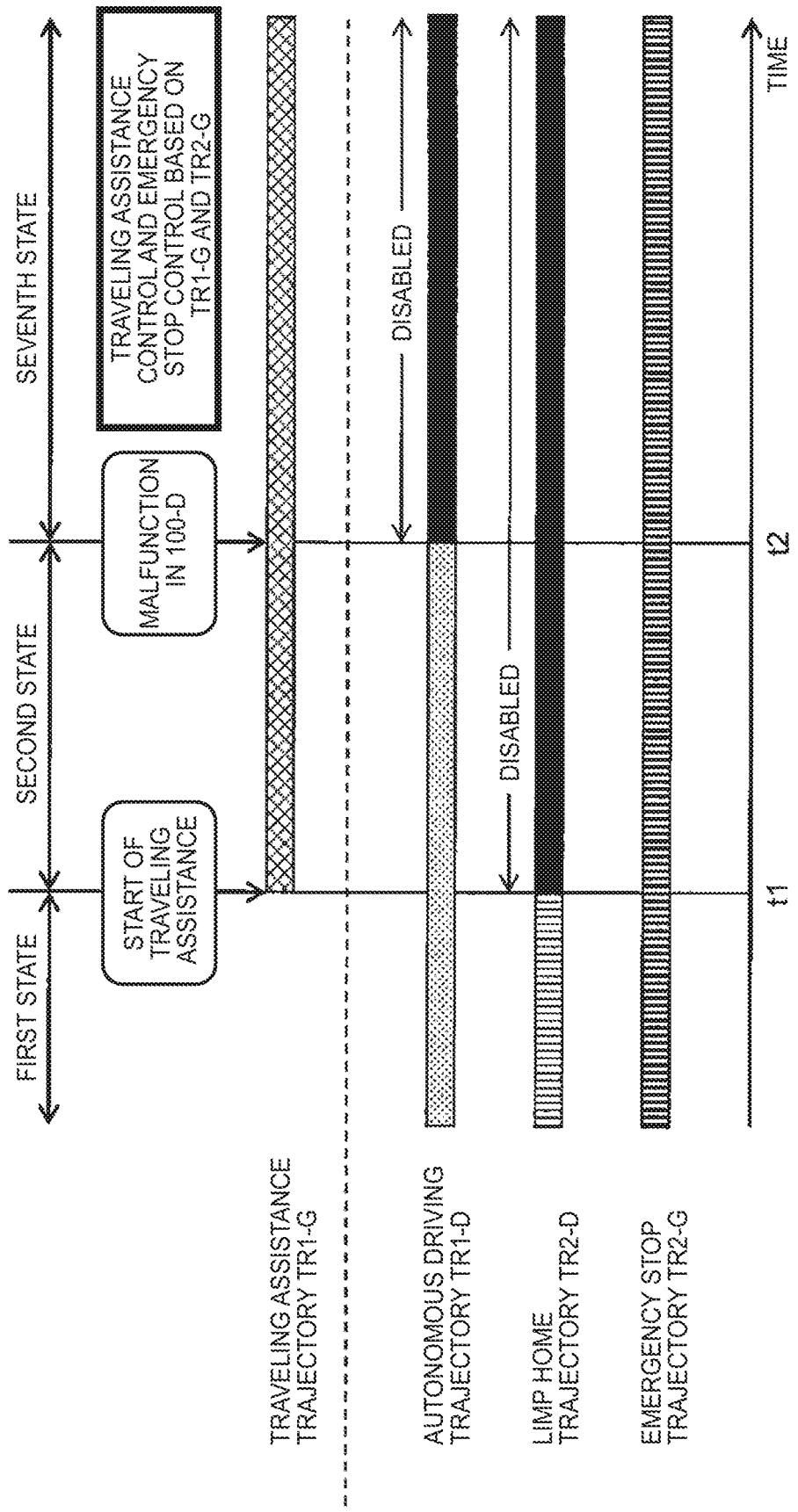
FIG. 23 is a timing chart for describing a seventh example of the vehicle traveling control to be executed by the vehicle control system according to the fourth embodiment of the present disclosure.

FIG. 23 is a timing chart for describing a seventh example of the vehicle traveling control according to this embodiment. Description overlapping those of the above examples is omitted as appropriate.

The autonomous driving control device 100-D malfunctions, that is, the autonomous driving control device 100-D is the malfunctioning device 100F during the second state. This state is hereinafter referred to as a "seventh state". In the example illustrated in FIG. 23, a period after a time t2 corresponds to the seventh state.

In the seventh state, the vehicle traveling control device 200 disables the autonomous driving trajectory TR1-D in accordance with the disabling rule described above. Since the execution of the traveling assistance control continues, the limp home trajectory TR2-D remains disabled. Thus, the vehicle traveling control device 200 executes the vehicle traveling control based on the emergency stop trajectory TR2-G in accordance with the priority rule described above.

At this time, the traveling assistance trajectory TR1-G is also output. Thus, the vehicle traveling control device 200 executes the vehicle traveling control based on the traveling assistance trajectory TR1-G and the emergency stop trajectory TR2-G output from the traveling assistance control device 100-G. More specifically, the vehicle traveling control device 200 performs arbitration between the traveling assistance trajectory TR1-G and the emergency stop trajectory TR2-G in accordance with the arbitration rule described above, and executes the vehicle traveling control based on the arbitration result. Whether the steering control is executed depends on the traveling assistance trajectory TR1-G, but at least the deceleration control is executed. Thus, the vehicle 1 stops.

4-3-8. Eighth Example

Figure 24:
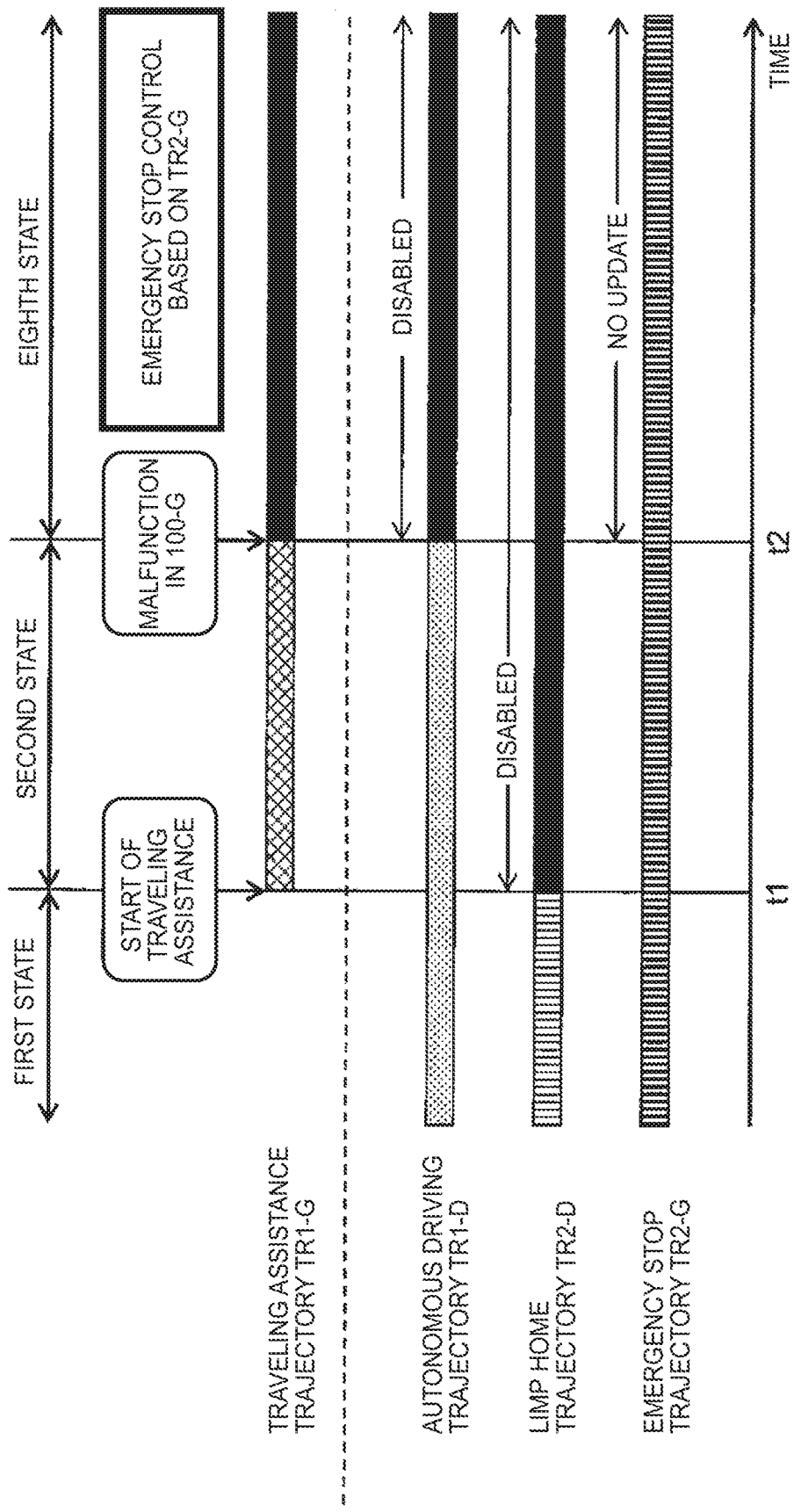
FIG. 24 is a timing chart for describing an eighth example of the vehicle traveling control to be executed by the vehicle control system according to the fourth embodiment of the present disclosure.

FIG. 24 is a timing chart for describing an eighth example of the vehicle traveling control according to this embodiment. Description overlapping those of the above examples is omitted as appropriate.

The traveling assistance control device 100-G malfunctions, that is, the traveling assistance control device 100-G is the malfunctioning device 100F during the second state. This state is hereinafter referred to as an "eighth state". In the example illustrated in FIG. 24, a period after a time t2 corresponds to the eighth state.

In the eighth state, the vehicle traveling control device 200 disables the autonomous driving trajectory TR1-D and the limp home trajectory TR2-D in accordance with the disabling rule described above. The vehicle traveling control device 200 executes the vehicle traveling control based on the emergency stop trajectory TR2-G in accordance with the priority rule described above.

While the traveling assistance control device 100-G malfunctions, the emergency stop trajectory TR2-G is not appropriately updated or output. Thus, the vehicle traveling control device 200 executes the vehicle traveling control based on an emergency stop trajectory TR2-G output from the traveling assistance control device 100-G before the malfunction occurs. For example, the vehicle traveling control device 200 executes the vehicle traveling control based on an emergency stop trajectory TR2-G output from the traveling assistance control device 100-G for the last time before the malfunction occurs. Thus, the vehicle 1 stops.

The vehicle traveling control device 200 stores the traveling assistance trajectory TR1-G output from the traveling assistance control device 100-G before the malfunction occurs. After the malfunction occurs, the vehicle traveling control device 200 may execute the traveling assistance control in a feedforward manner in consideration of the traveling assistance trajectory TR1-G as well. That is, in the eighth state, the vehicle traveling control device 200 may execute the vehicle traveling control based on the traveling assistance trajectory TR1-G and the emergency stop trajectory TR2-G output from the traveling assistance control device 100-G before the malfunction occurs. More specifically, the vehicle traveling control device 200 performs arbitration between the traveling assistance trajectory TR1-G and the emergency stop trajectory TR2-G in accordance with the arbitration rule described above, and executes the vehicle traveling control based on the arbitration result. Thus, at least the deceleration control is executed, and the vehicle 1 stops.

4-4. Effects

As described above, when the malfunctioning device 100F exists, the vehicle traveling control device 200 according to this embodiment executes the vehicle traveling control based on the limp home trajectory TR2-D or the emergency stop trajectory TR2-G. Specifically, when the autonomous driving control device 100-D malfunctions, the vehicle traveling control device 200 executes the vehicle traveling control based on the limp home trajectory TR2-D output before the malfunction occurs, or based on the emergency stop trajectory TR2-G output from the normal traveling assistance control device 100-G. When the traveling assistance control device 100-G malfunctions, the vehicle traveling control device 200 executes the vehicle traveling control based on the emergency stop trajectory TR2-G output before the malfunction occurs. Thus, the vehicle 1 stops promptly, and the safety of the vehicle 1 is secured. This operation contributes to improvement in the reliability of the vehicle control system 10.

5. Fifth Embodiment

A fifth embodiment is a modified example of the fourth embodiment. Description overlapping that of the fourth embodiment is omitted as appropriate.

Figure 25:
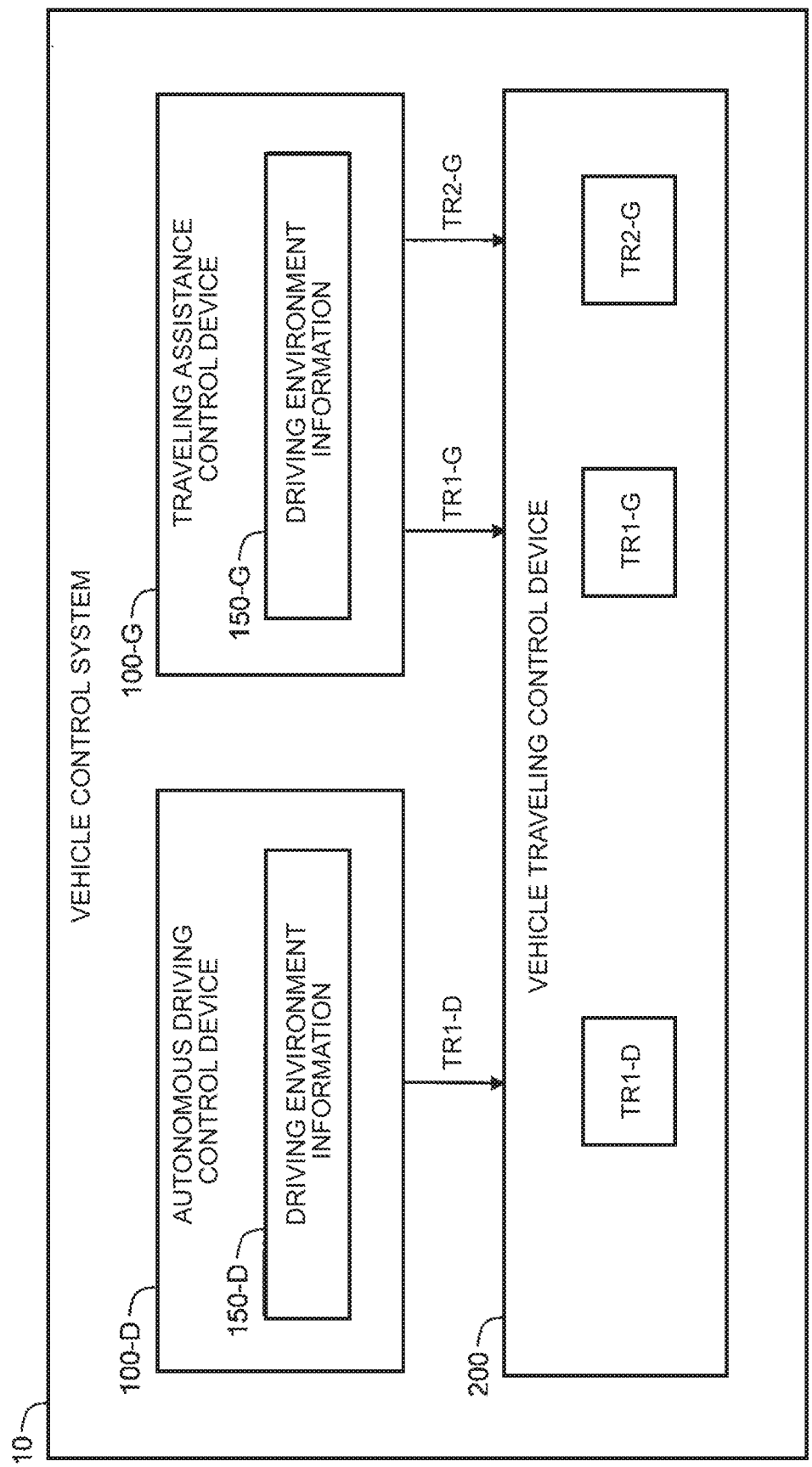
FIG. 25 is a block diagram schematically illustrating the configuration of a vehicle control system according to a fifth embodiment of the present disclosure.

FIG. 25 is a block diagram schematically illustrating the configuration of a vehicle control system 10 according to the fifth embodiment. In the fifth embodiment, the limp home trajectory TR2-D is omitted. That is, the autonomous driving control device 100-D generates and outputs only the autonomous driving trajectory TR1-D.

FIG. 26 is a timing chart for describing an example of vehicle traveling control according to this embodiment. The autonomous driving control device 100-D malfunctions, that is, the autonomous driving control device 100-D is the malfunctioning device 100F during the first state. This state is hereinafter referred to as a "ninth state". In the example illustrated in FIG. 26, a period from a time t1 to a time t2 corresponds to the ninth state.

In the ninth state, the vehicle traveling control device 200 disables the autonomous driving trajectory TR1-D in accordance with the disabling rule described above. The vehicle traveling control device 200 executes the vehicle traveling control based on the emergency stop trajectory TR2-G output from the traveling assistance control device 100-G. Thus, the vehicle 1 stops. As compared to the third state illustrated in FIG. 19, the limp home trajectory TR2-D does not exist, and therefore the emergency stop trajectory TR2-G is used as a substitute for the limp home trajectory TR2-D.

The vehicle traveling control in the other states is similar to that of the fourth embodiment (see FIG. 17 to FIG. 18 and FIG. 20 to FIG. 24).

The fifth embodiment also attains effects similar to those of the fourth embodiment.

What is claimed is:

1. A vehicle control system configured to control a vehicle, the vehicle control system comprising:
   a plurality of target trajectory generation devices configured to generate and output a first target trajectory and a second target trajectory, the first target trajectory and the second target trajectory each including a target position and a target speed of the vehicle, the first target trajectory is a trajectory for performing at least one of steering, acceleration, and deceleration of the vehicle, and the second target trajectory is a trajectory for decelerating and stopping the vehicle, the second target trajectory is updated continuously; and
   a vehicle traveling control device configured to:
   receive the first target trajectory and the second target trajectory from the plurality of target trajectory generation devices;
   determine whether one or more of the target trajectory generation devices are malfunctioning;
   upon determination that none of the target trajectory generation devices are malfunctioning, execute vehicle traveling control based on the first target trajectory output from the plurality of trajectory generation devices; and
   upon determination that one or more of the target trajectory generation devices are malfunctioning, cause the vehicle to stop by executing vehicle traveling control based on the latest second target trajectory output from the plurality of target trajectory generation devices before the malfunction occurs, or based on the second target trajectory output from a target trajectory generation device other than the malfunctioning device among the plurality of target trajectory generation devices.

2. The vehicle control system according to claim 1, wherein the target trajectory generation devices include:
   an autonomous driving control device configured to generate and output at least an autonomous driving trajectory; and
   a traveling assistance control device configured to generate and output a traveling assistance trajectory and an emergency stop trajectory,
   the autonomous driving trajectory is the first target trajectory for autonomous driving of the vehicle,
   the traveling assistance trajectory is the first target trajectory for improving safety of the traveling of the vehicle or stabilizing behavior of the vehicle,
   the emergency stop trajectory is the second target trajectory for decelerating and stopping the vehicle,
   the traveling assistance control device is configured to determine whether a predetermined execution condition is satisfied, and generate and output the traveling assistance trajectory when the predetermined execution condition is satisfied,
   the vehicle traveling control device is configured to execute the vehicle traveling control based on the autonomous driving trajectory in a first state in which none of the target trajectory generation devices are malfunctioning, the autonomous driving trajectory is output from the autonomous driving control device, and the traveling assistance trajectory is not output from the traveling assistance control device, and
   the vehicle traveling control device is configured to execute the vehicle traveling control based on the autonomous driving trajectory and the traveling assistance trajectory in a second state in which the plurality of target trajectory generation devices are malfunctioning, the autonomous driving trajectory is output from the autonomous driving control device, and the predetermined execution condition is satisfied and the traveling assistance trajectory is output from the traveling assistance control device.

3. The vehicle control system according to claim 2, wherein the autonomous driving control device is further configured to generate and output a limp home trajectory, which is the second target trajectory for decelerating and stopping the vehicle.

4. The vehicle control system according to claim 3, wherein the autonomous driving control device is configured to update and output the limp home trajectory continuously.

5. The vehicle control system according to claim 3, wherein the vehicle traveling control device is configured to stop, in a third state in which the autonomous driving control device is malfunctioning during the first state, the vehicle by executing the vehicle traveling control based on the limp home trajectory output from the autonomous driving control device before the malfunction occurs.

6. The vehicle control system according to claim 5, wherein the vehicle traveling control device is configured to stop, in a fourth state in which the traveling assistance control device is also malfunctioning during the third state, the vehicle by executing the vehicle traveling control based on the emergency stop trajectory output from the traveling assistance control device before the malfunction occurs.

7. The vehicle control system according to claim 5, wherein the vehicle traveling control device is configured to stop, in a fifth state in which the predetermined execution condition is satisfied and the traveling assistance trajectory is output from the traveling assistance control device during the third state, the vehicle by executing deceleration control based on higher deceleration level of the traveling assistance trajectory and the emergency stop trajectory output from the traveling assistance control device.

8. The vehicle control system according to claim 2, wherein the vehicle traveling control device is configured to stop, in a sixth state in which the traveling assistance control device is malfunctioning during the first state, the vehicle by executing the vehicle traveling control based on the emergency stop trajectory output from the traveling assistance control device before the malfunction occurs.

9. The vehicle control system according to claim 2, wherein the vehicle traveling control device is configured to stop, in a seventh state in which the autonomous driving control device is malfunctioning during the second state, the vehicle by executing deceleration control based on higher deceleration level of the traveling assistance trajectory and the emergency stop trajectory output from the traveling assistance control device.

10. The vehicle control system according to claim 2, wherein the vehicle traveling control device is configured to stop, in an eighth state in which the traveling assistance control device is malfunctioning during the second state, the vehicle by executing deceleration control based on higher deceleration level of the emergency stop trajectory output from the traveling assistance control device before the malfunction occurs.

11. The vehicle control system according to claim 10, wherein the vehicle traveling control device is configured to stop, in the eighth state, the vehicle by executing the vehicle traveling control based on the traveling assistance trajectory and the emergency stop trajectory output from the traveling assistance control device before the malfunction occurs.

12. The vehicle control system according to claim 2, wherein the vehicle traveling control device is configured to stop, in a ninth state in which the autonomous driving control device is the malfunctioning device during the first state, the vehicle by executing the vehicle traveling control based on the emergency stop trajectory output from the traveling assistance control device.

13. The vehicle control system according to claim 2, wherein the traveling assistance control device is configured to update and output the emergency stop trajectory continuously.

14. The vehicle control system according to claim 1, wherein the second target trajectory is continuously updated based on at least one of a map information and a surrounding condition information.

* * * * *